United States Patent [19]
Duffty et al.

[11] 3,708,000
[45] Jan. 2, 1973

[54] METHOD AND APPARATUS FOR HARVESTING TREES

[75] Inventors: Bryan Duffty, Theodore B. Golob, Stanley C. Jasinski, Jack Zwart, all of Woodstock, Ontario, Canada

[73] Assignee: Eaton Yale & Towne Canada Ltd., London, Ontario, Canada

[22] Filed: Dec. 7, 1970

[21] Appl. No.: 95,592

[30] Foreign Application Priority Data

Oct. 14, 1970 Canada..................................95528

[52] U.S. Cl...................................144/3 D, 144/2 Z
[51] Int. Cl. ............................................A01g 23/02
[58] Field of Search...144/2 Z, 3 D, 34 R, 34 E, 309 AC

[56] References Cited

UNITED STATES PATENTS

| | | | |
|---|---|---|---|
| 3,059,677 | 10/1962 | Busch et al. | 144/3 D |
| 3,269,437 | 8/1966 | Busch | 144/2 Z |
| 3,443,611 | 5/1969 | Jorgensen | 144/2 Z |
| 3,464,468 | 9/1969 | Thompson et al. | 144/3 D |
| 3,529,640 | 9/1970 | Kamner | 144/3 D |
| 3,531,235 | 9/1970 | Boyd et al. | 144/3 D |
| 3,556,183 | 1/1971 | Busch | 144/34 R |
| 3,620,272 | 11/1971 | Eriksson | 144/3 D |

Primary Examiner—Gerald A. Dost
Attorney—Young & Tarolli

[57] ABSTRACT

A tree harvester includes a tree-processing apparatus for delimbing and cutting a tree into bolts of a predetermined length. The processing apparatus includes a delimbing mechanism, a cutting mechanism, and a clamping mechanism. The delimbing mechanism is operable to delimb the tree upon relative movement between the tree and the delimbing mechanism. The clamping mechanism is operable to engage the tree and pull the tree through the delimbing mechanism to thereby effect delimbing of the tree. The cutting mechanism is located between the clamping mechanism and the delimbing mechanism and is operable to cut the tree into bolts of a predetermined length after the tree has been delimbed and the bolts are then deposited in a bunk mechanism for storage. The delimbing mechanism is fixedly supported on a tree-processing boom which is pivotable relative to the vehicle about a substantially horizontal axis when a tree is placed in the delimbing mechanism so that the boom assumes a position which is parallel to the tree when the tree is placed in the delimbing mechanism. The cutting and clamping mechanisms are also supported on the boom and are movable along the boom relative to the delimbing mechanism to enable a tree to be sequentially clamped, delimbed and cut into bolts. Means is provided for sensing the diameter of the tree as the tree passes through the processing apparatus and which is operable to effect ejectment of the top of the tree from the apparatus when the diameter of the tree in the apparatus is below a predetermined diameter.

46 Claims, 22 Drawing Figures

INVENTORS
BRYAN DUFFTY
THEODORE B. GOLOB
STANLEY C. JASINSKI
JACK ZWART

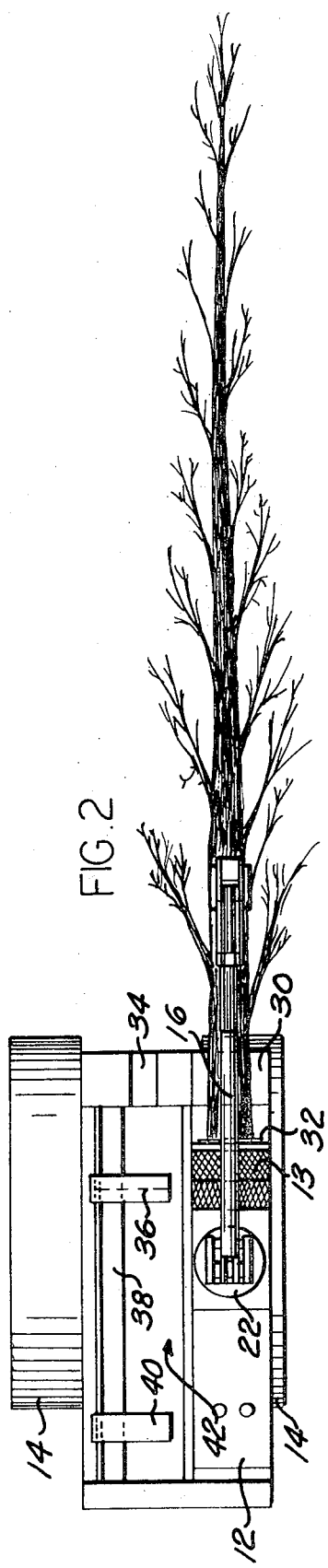
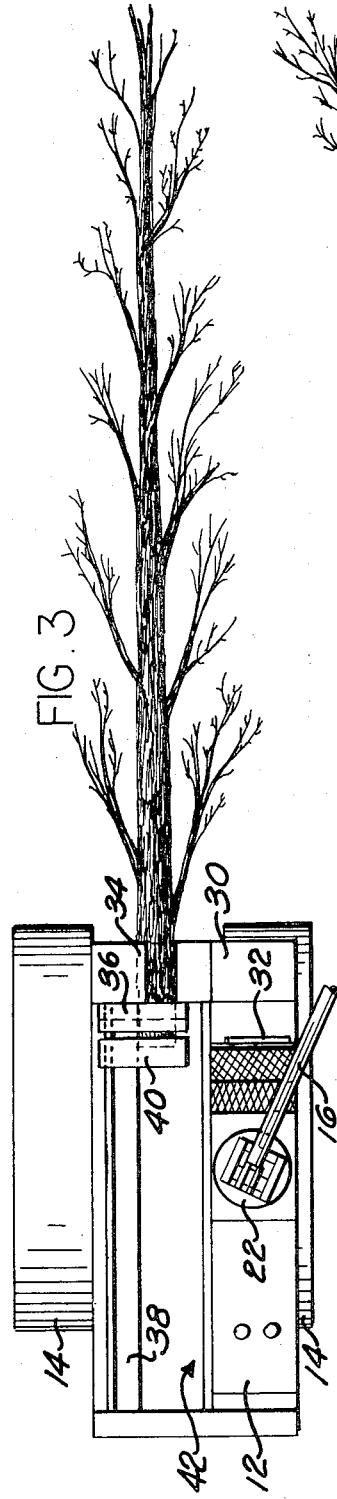
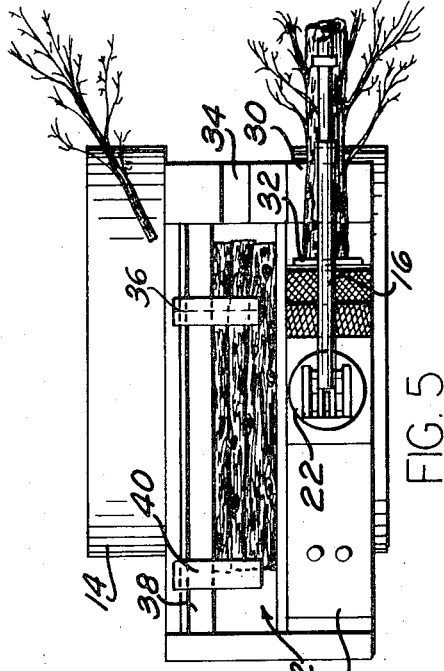
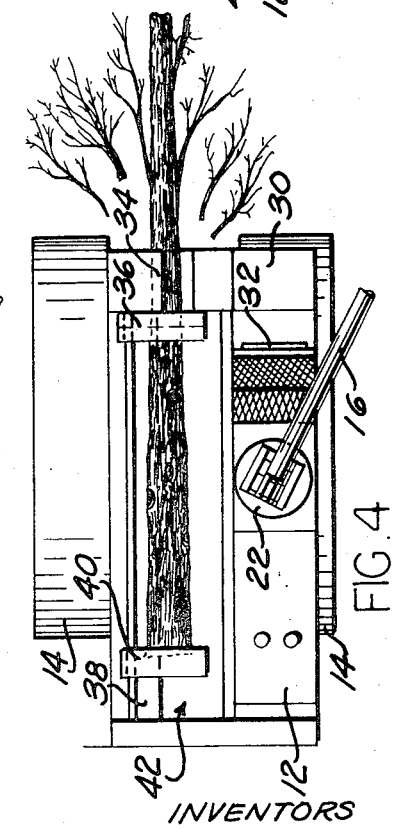
INVENTORS
BRYAN DUFFTY
THEODORE B. GOLOB
STANLEY C. JASINSKI
JACK ZWART

INVENTORS
BRYAN DUFFTY
THEODORE B. GOLOB
STANLEY C. JASINSKI
JACK ZWART

INVENTORS
BRYAN DUFFTY
THEODORE B. GOLOB
STANLEY C. JASINSKI
JACK ZWART

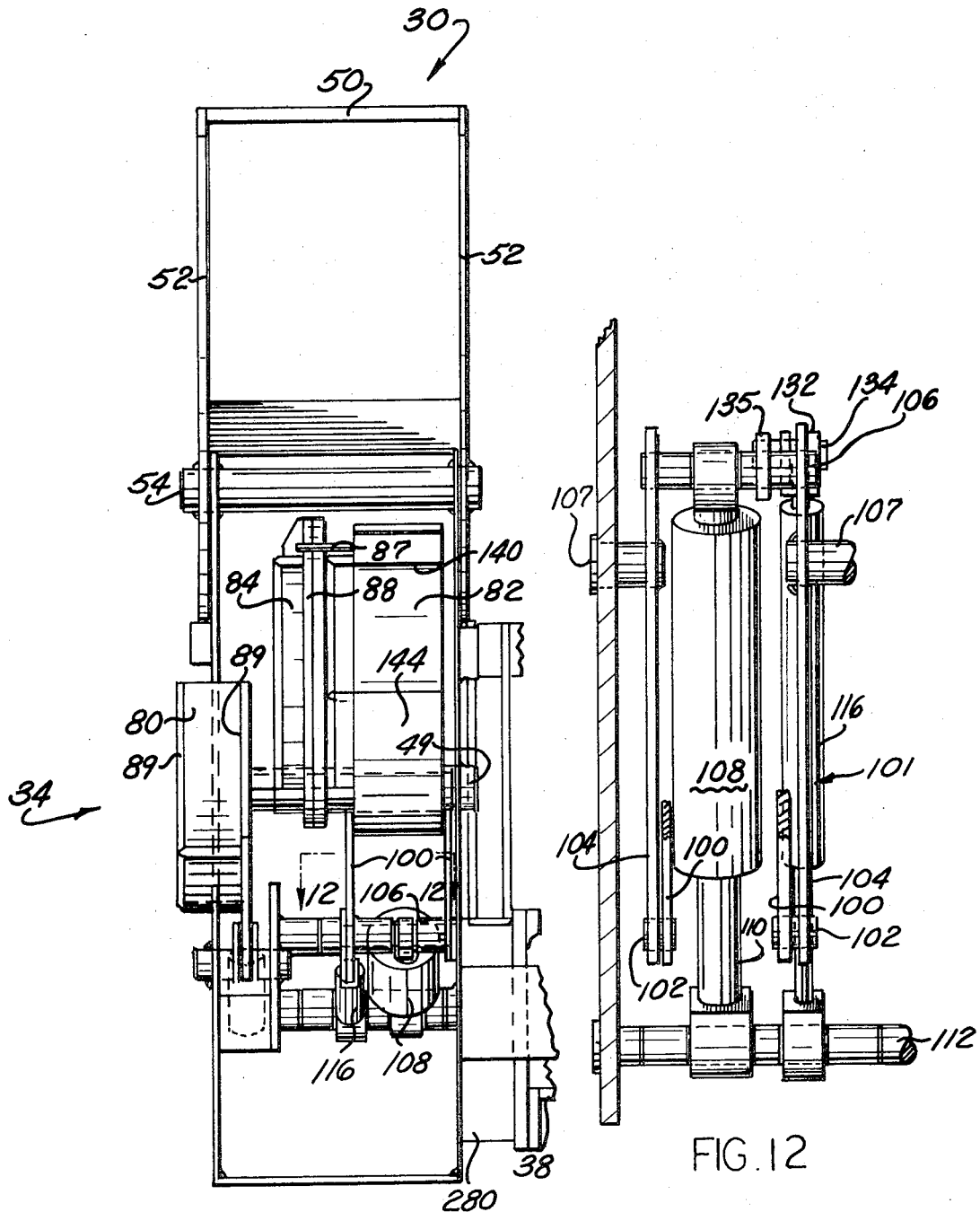

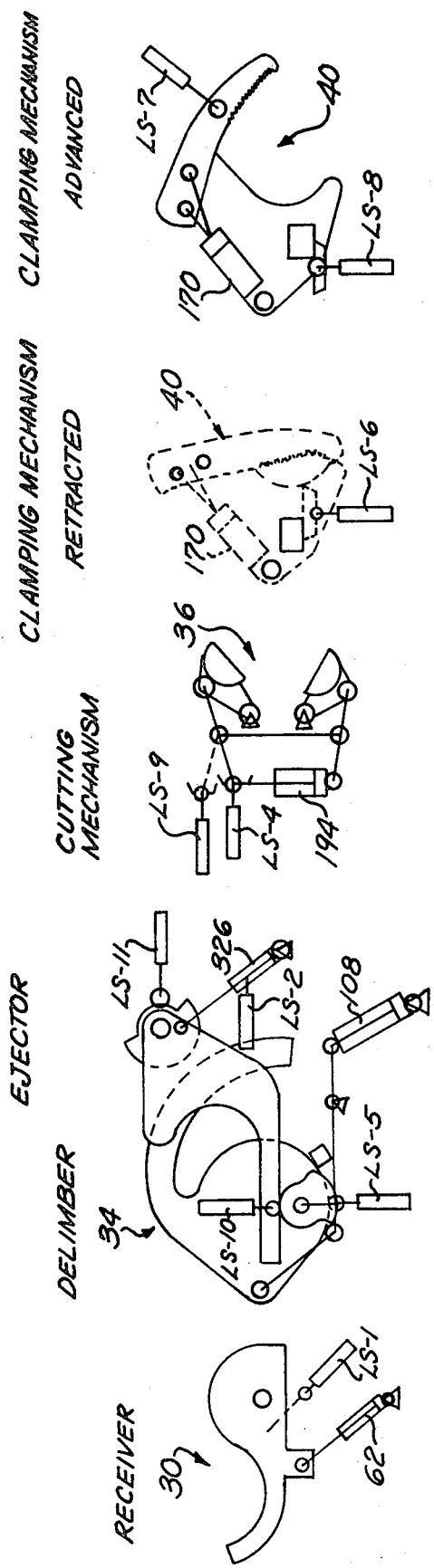
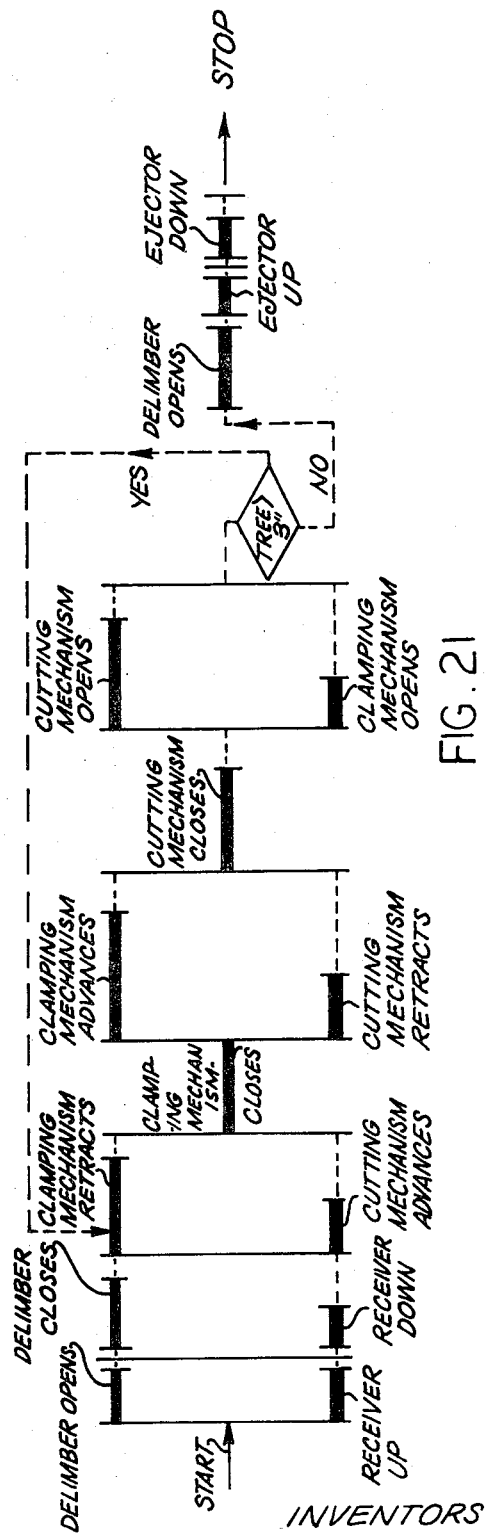
FIG. 22
FIG. 21

METHOD AND APPARATUS FOR HARVESTING TREES

The present invention relates to a method and an apparatus for use in harvesting trees, and more specifically to a short wood harvester which is operable to fell trees, delimb the trees, and buck into bolts of a predetermined length the trunks of the delimbed trees.

Known tree harvesters which are operable to fell, delimb and cut the trees into bolts have certain disadvantages associated therewith which lead to inefficient operation thereof. One such known tree harvester is disclosed in the Busch U.S. Pat. No. 3,269,437 and shows a mechanism for moving the tree which is mounted between a shear and a delimbing mechanism. The mechanism for moving the tree pulls the tree through the delimbing mechanism and then pushes the tree into the shear. This method of operation is very inefficient in that the mechanism for moving the tree must move two strokes before a bolt of the tree may be cut therefrom. This is due to the fact that the first stroke pulls the trunk through the delimber and the second stroke, which pulls another portion of the trunk through the delimber, pushes the trunk through the shear. These extra strokes reduce the efficiency of the Busch machine and increase the time it takes to harvest a tree. Busch also suffers from the disadvantage that to eject a portion of the tree which has a small diameter requires needless delimbing of that portion before that portion of the tree may be cut from the rest of the tree by the shear. This is due to the fact that the shear is located behind the mechanism for moving the tree and the delimbing mechanism which necessitates movement of the tree through the delimber prior to movement through the shear. The delimber and shear of the Busch machine are fixed on a support so that they may not move relative to each other. This construction results in a large overall length of the machine.

Another known tree harvester, disclosed in the Boyd et al. U.S. Pat. No. 3,590,760, filed July 22, 1968 and assigned to the same assignee as the present invention, discloses a method and an apparatus for felling, delimbing and bucking a stand of trees. In the Boyd tree harvester, the delimber and the means for moving the tree relative to the shear are the same. During the delimbing operation, the delimber mechanism moves away from the shear and out along the tree to effect delimbing thereof. This type of delimbing operation results in a large overall length of the tree harvester with the apparatus being relatively cumbersome in confined quarters. Moreover, the operation of the machine is inefficient for the same reasons as discussed hereinabove with respect to the Busch timber harvester.

The present invention overcomes the disadvantages of the prior art by locating the cutting mechanism between the delimber and the clamping mechanisms so that the clamping mechanism engages the tree and moves the tree through the cutting and the delimbing mechanisms during each stroke to the clamping mechanism. This construction enables one bolt to be cut from the tree after each stroke of the clamping mechanism and provides for ejectment of a portion of the tree from the apparatus prior to delimbing of that portion. Moreover, the present invention provides for efficient processing of a tree by providing new and improved apparatus for delimbing the tree, for mounting the delimber, the cutting and the clamping mechanisms, and for storing the bolts after they are cut from the tree.

Accordingly, an aspect of the present invention is to provide a new and improved apparatus for use in harvesting trees which is capable of felling and processing a stand of trees and which overcomes the hereinabove-discussed disadvantages by providing an efficient and compact apparatus for use in harvesting trees.

Another aspect of the present invention is to provide a new and improved apparatus for use in harvesting trees including a support, a delimbing mechanism mounted on the support for delimbing a tree upon movement of the tree relative thereto, a clamping mechanism mounted on the support and movable toward and away from the delimbing mechanism for respectively engaging a tree and moving the tree relative to the delimbing mechanism, and a cutting mechanism mounted on the support between the clamping and the delimbing mechanisms for cutting the tree into bolts of a predetermined length.

A further aspect of the present invention is to provide a new and improved apparatus for use in harvesting trees, as noted in the next preceding paragraph further including means for moving the cutting mechanism toward the delimbing mechanism upon movement of the clamping mechanism toward the delimbing mechanism so as to enable the apparatus to have a reduced overall length which provides for efficient operation in confined quarters.

A still further aspect of the present invention is to provide a new and improved apparatus for use in harvesting trees including a delimbing mechanism for delimbing a felled tree upon relative movement between the tree and the delimbing mechanism and which includes a first delimbing knife for delimbing a first portion of the outer circumference of the tree, a second delimbing knife for delimbing a second portion of the outer circumference of the tree, means for effecting movement of the second delimbing knife into engagement with the tree and for maintaining the second delimbing knife in engagement with the tree as the diameter of the portion of the tree with which it engaged varies and wherein the second delimbing knife includes means for locating the center of the tree in a predetermined plane and maintaining the center of the tree in the plane as the tree is delimbed.

Still another aspect of the present invention is to provide a new and improved apparatus for use in harvesting trees, as noted in the next preceding paragraph, wherein the delimbing mechanism further includes a third delimbing knife for delimbing a third portion of the outer circumference of the tree, and the second and third delimbing knives are supported for pivotable movement about a common axis from a retracted position to a working position in which the first and second delimbing knives engage with the tree to effect delimbing thereof.

A further aspect of the present invention is to provide a new and improved apparatus for use in harvesting trees including a delimbing mechanism for delimbing a tree which is moved relative thereto and which includes a first delimbing knife for delimbing a first portion of the outer circumference of the tree, a second delimbing knife for delimbing a second portion of the outer circumference of the tree, a third delimbing knife for delimbing a third portion of the outer circumference of the tree, means for moving the second and third delimbing knives relative to the first delimbing knife into working engagement with the tree and for maintaining the second and third delimbing knives against the tree to effect delimbing thereof as the diameter of the portion of the tree with which they are engaged varies and wherein the second and third delimbing knives are supported for pivotal movement about a common axis.

A still further aspect of the present invention is to provide a new and improved apparatus for use in harvesting trees including a delimbing mechanism for delimbing a tree upon movement therebetween, a cutting mechanism for cutting the tree into bolts, ejector means for ejecting a portion of the tree from the delimbing mechanism when the portion of the tree in the delimbing mechanism is below a predetermined diameter, sensing means responsive to movement of a member which is part of the delimbing mechanism for sensing the diameter of the portion of the tree in the delimbing mechanism, and means responsive to the sensing means for actuating the ejector means to thereby effect ejection of the portion of the tree in the delimbing mechanism when the portion of the tree has a diameter which is less than a predetermined diameter.

Still another aspect of the present invention is to provide a new and improved apparatus for use in harvesting trees including a support, a tree-processing boom carried by the support, a delimbing mechanism carried by the boom for delimbing a tree upon relative movement therebetween, a clamping mechanism carried by the boom for moving the tree relative to the delimbing mechanism, and means providing for pivotable movement of the boom about a substantially horizontal axis in response to the weight of a tree located in the delimbing mechanism so that the boom will assume an angular relationship with a reference plane which is the same as the angular relationship of the tree with the reference plane so that the boom will assume a position which is substantially parallel to the tree disposed in the delimbing mechanism.

Another aspect of the present invention is to provide a new and improved apparatus for use in harvesting trees including a tree-processing means for delimbing a tree and cutting the tree into bolts of a predetermined length and a bunk mechanism for receiving, storing and dumping the bolts of the tree and wherein the bunk mechanism includes support means, at least a pair of substantially arcuate members extending downwardly from the support means and cooperating to support the bolts and a mechanism for moving the members endwise upwardly relative to the support means to thereby impart a rolling motion to the bolts as the bolts are dumped so as to prevent the bolts from becoming wedged in the bunk mechanism.

Further aspects and advantages of the present invention should become apparent from the following detailed description of a preferred embodiment of the present invention made with reference to the accompanying drawings forming a part of the specification and wherein:

FIG. 2 is a top schematic representation of the tree harvester mechanism showing the tree-engaging boom locating the tree in the receiver mechanism;

FIG. 3 is a top schematic view of the tree harvester mechanism showing the tree engaged in the delimber mechanism and the clamping and cutting mechanisms moved toward the delimber to enable the clamping mechanism to engage with the tree;

FIG. 4 is a top schematic view illustrating the clamping mechanism pulling the tree through the delimbing mechanism;

FIG. 5 is a top schematic view showing the bolt of the tree in the bunk mechanism and the ejector mechanism energized to effect ejectment of the remnant of the tree from the delimbing mechanism;

FIG. 11 is a top view of the delimber and receiver mechanisms taken approximately along the line 11—11 of FIG. 6;

FIG. 12 is a side view of the delimber mechanism more fully illustrating the fluid means for moving and maintaining the second delimber knife in engagement with a tree taken approximately along the line 12—12 of FIG. 11;

FIG. 21 is a schematic representation of the cycle of the tree processing mechanism; and FIG. 22 is a schematic representation of receiver, delimber, cutting and clamping mechanisms and the control means associated therewith.

The present invention relates to an apparatus for use in harvesting trees, and more specifically to a short wood tree harvester which is operable to fell and process a stand of trees. The short wood tree harvester includes processing apparatus for delimbing a tree and cutting it into bolts of a predetermined length. The apparatus includes a delimbing mechanism for delimbing the tree, a clamping mechanism for engaging the tree and moving the tree relative to the delimbing mechanism to effect delimbing thereof and a cutting mechanism for cutting the tree into a plurality of bolts of a predetermined length. After the tree is felled, it is moved into the delimbing mechanism and the clamping mechanism engages therewith and pulls the tree through the delimbing mechanism to effect delimbing thereof. The cutting mechanism then cuts a bolt of a predetermined length from the portion of the tree which has been delimbed and drops the bolt into a bunk mechanism. The clamp then moves forward to engage a second portion of the tree and pull it through the delimbing mechanism. The cutting mechanism then cuts off the second portion of the tree and drops it into the bunk mechanism. This process is repeated until a sensing mechanism, which is associated with the delimbing mechanism, senses the portion of the tree which is in the delimbing mechanism to be below a predetermined diameter. The sensing mechanism then energizes an ejector mechanism which ejects the remnant of the tree from the processing apparatus. The above sequence is repeated until the bunk mechanism is full. When the bunk mechanism is full, bolts of the tree may then be transported to a station where they are dumped from the bunk mechanism.

Figure 1:
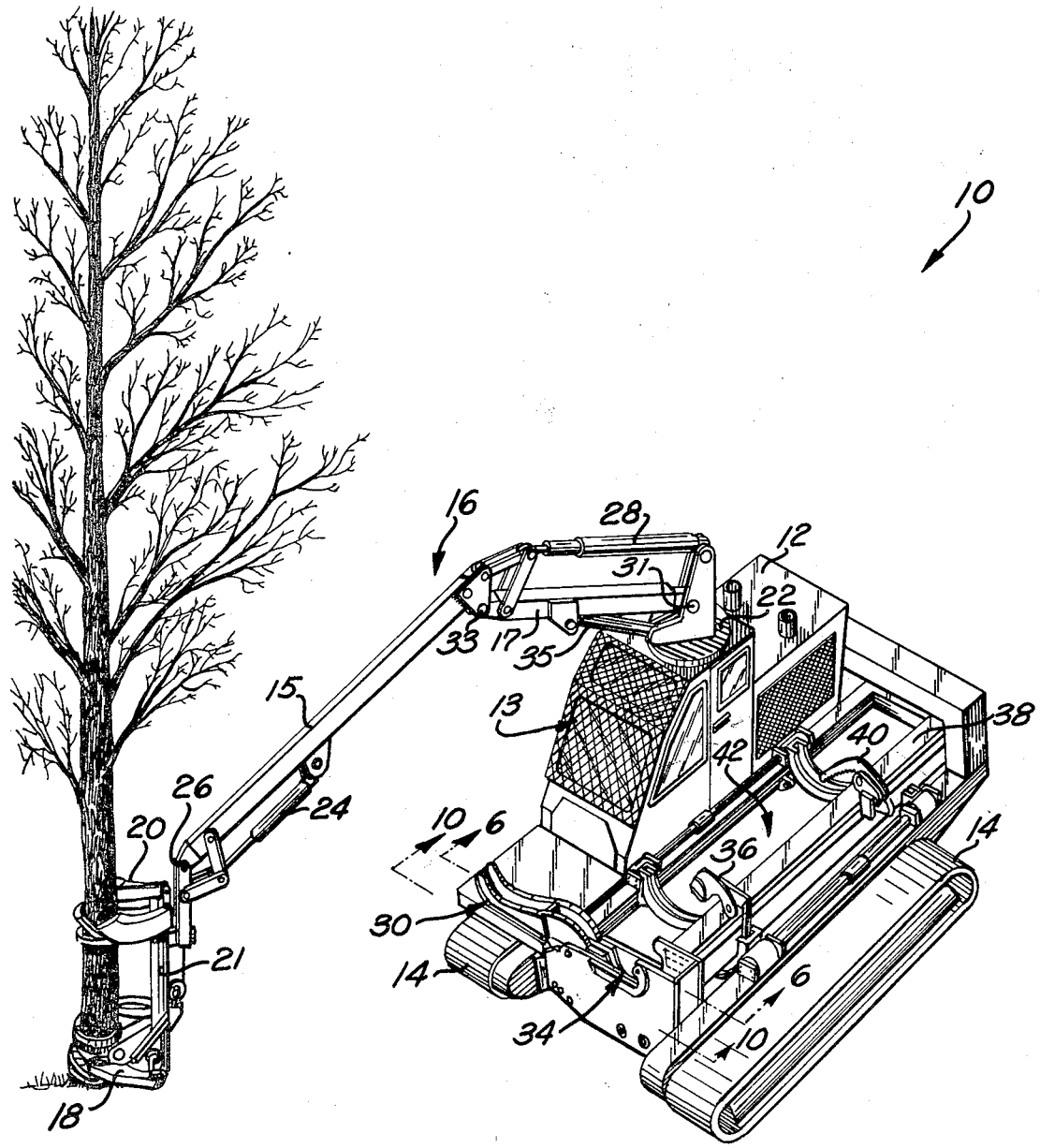
FIG. 1 is a perspective view of the tree harvester mechanism showing the tree-engaging boom felling a standing tree.

Referring to FIG. 1, a short wood tree harvester 10 is illustrated. The tree harvester 10 includes a support structure 12 which preferably may be a self-propelled vehicle mounted on a pair of tracks 14. The vehicle 12 includes an operator station 13 which includes suitable controls for energizing and operating the apparatus associated therewith.

Disposed on an upper portion of the vehicle 12 is a tree-engaging or tree-harvesting boom assembly 16. The boom assembly 16 includes a shear 18 and a clamping means 20 mounted on one end thereof and which are operable to cut and grip a standing tree, respectively. The boom assembly 16 is suitably pivoted about a base portion 22 by conventional means which are not illustrated. The shear 18 and the clamp 20 are located on a support member 21 which is pivotally attached about the pivot pin 26 to the main boom member 15. A fluid cylinder 24, pivotally attached to the member 15, is operatively associated with the support member 21 so as to be able to pivot the shear 18 and the clamp 20 about the pivot pin 26 in a well-known manner upon pressurization thereof.

The upper portion of the tree-harvesting boom 15 is pivotally supported on a support structure 17 by the pivot pin 33. A fluid cylinder 28 is operable to pivot the boom 15 about the pivot pin 33 and a fluid cylinder 35 is operable to pivot the support structure 17 about the pivot pin 31 which is suitably attached by a bracket to the base 22. Thus, it should be apparent that the boom assembly 16 and the clamp 20 and shear 18, mounted thereon, are pivotable in a vertical plane about the pivot pins 26, 33 and 31 and in a horizontal plane about the base 22. The pivotable construction of the boom assembly 16 is well known and enables the clamp 20 and the shear 18 to grip and shear trees which are situated at various angles relative to the ground. While a specific structure for the boom assembly 16 has been illustrated, it should be realized that many analogous structures can be provided.

Located on the vehicle 12 is a receiver mechanism 30 which is operable to receive a felled tree from the clamp 20 on the boom 16. After a tree has been cut by the shear 18, the clamp 20 continues to grip the tree and the boom assembly 16 effects movement of the tree to the position shown in FIG. 2 to locate the tree in the receiver mechanism 30, the clamp 20 is opened and boom assembly 16 is moved to engage another standing tree.

Disposed adjacent the receiver mechanism 30 is a delimbing mechanism 34 which is operable to receive the tree from the receiver mechanism 30 upon energization of the receiver mechanism 30. When the receiver mechanism 30 is energized, the tree is transferred to the delimbing mechanism 34 and assumes the position illustrated in FIG. 3. The delimbing mechanism 34 is mounted upon a processing boom 38 which is pivotally supported by the vehicle 12 so that the boom 38 will assume a position which is substantially parallel to the position assumed by the tree when the tree is engaged in the delimbing mechanism 34.

Mounted on the boom 38 is a cutting mechanism 36 which is operable to cut the tree into a plurality of bolts of a predetermined length and a clamping mechanism 40 which is movable along the boom and is operable to engage with the tree and move the tree relative to the cutting mechanism and the delimbing mechanisms. As illustrated in FIG. 3, when a tree is received in the delimbing mechanism 34, the clamping mechanism 40 is moved toward the delimbing mechanism 34 to engage with the butt of the tree which is disposed therein. When the clamping mechanism 40 is moved toward the delimbing mechanism 34, the cutting mechanism 36 is also moved toward the delimbing mechanism 34 to thereby enable the clamping mechanism to grip a butt portion of the tree which is contiguous with the delimbing mechanism.

After the clamping mechanism 40 engages with the butt of the tree located in the delimbing mechanism 34, the clamping mechanism is energized so as to move the tree through the delimbing mechanism 34 to the position shown in FIG. 4. Movement of the tree relative to the delimbing mechanism 34 effects delimbing of the portion of the tree which passes through the delimbing mechanism. At the same time, the cutting mechanism 36 moves away from the delimbing mechanism 34 to its position illustrated in FIG. 5. The delimbed portion of the tree is then cut by the cutting mechanism 36 and the clamping mechanism 40 is opened to allow the bolt of the tree to drop into a bunk mechanism 42, as shown in FIG. 5. The clamping mechanism 40 and the cutting mechanism 36 are then moved to their position shown in FIG. 3, and the clamping mechanism 40 engages a second portion of the tree which is in the delimbing mechanism 34. The clamping mechanism 40 then pulls the next sequential portion of the tree through the delimbing mechanism 34 to effect delimbing thereof and the cutting mechanism 36 moves away from the delimbing mechanism. The cutting mechanism 36 is again energized and the clamping mechanism 40 is opened to drop another bolt of a predetermined length in the bunk mechanism 42. This sequence of delimbing and cutting sequential portions of the tree is repeated until a sensing mechanism senses the diameter of the portion of the tree in the delimbing mechanism 34 to be below a predetermined diameter. When this occurs, the portion of the tree which remains in the delimbing mechanism 34 after a bolt has been cut therefrom will be ejected, as illustrated in FIG. 5, by an ejector mechanism which comprises part of the delimbing mechanism 34.

The shear 18 and the clamp 20 are operable to fell a plurality of trees independently of the processing apparatus for delimbing and cutting the tree into bolts. This allows one tree to be felled while another tree is being delimbed and cut into bolts by the processing apparatus to thereby provide for speedy harvesting and processing of trees by the tree harvester 10. While the shear 18 and the clamp 20 have not been described in detail, their construction is well known and their operation will not be described in detail herein.

Figure 6:
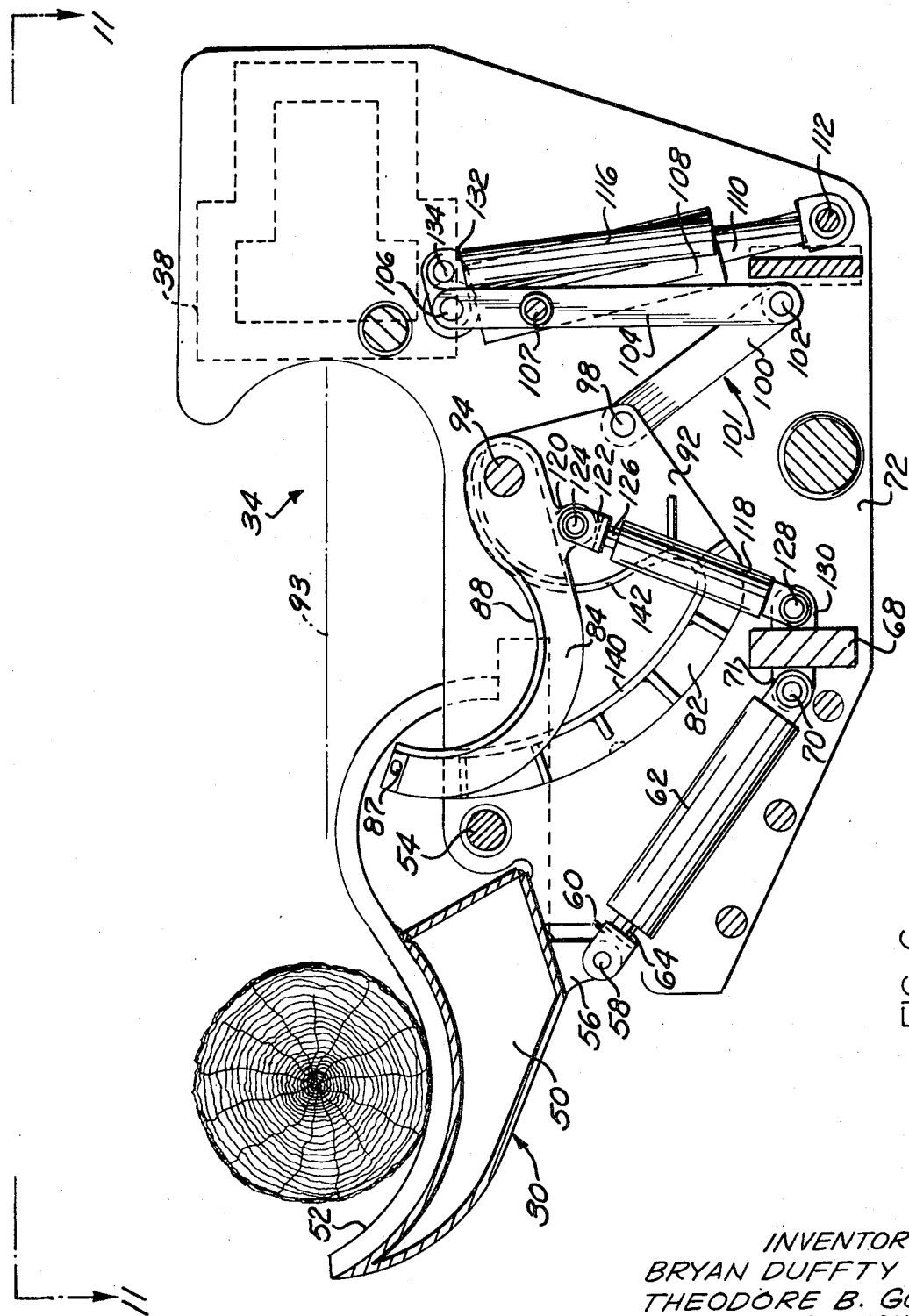
FIG. 6 is a front view of the delimber and receiver mechanisms taken approximately along the line 6—6 of FIG. 1 and showing a tree located in the receiver mechanism.
Figure 7:
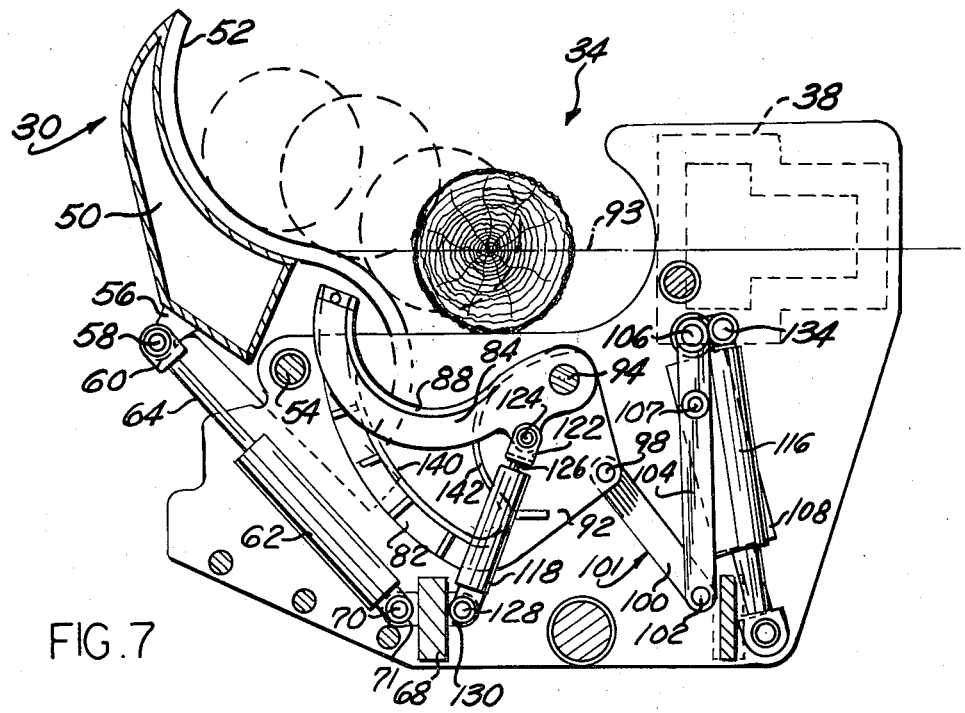
FIG. 7 is a front view of the delimber and receiver mechanisms of FIG. 6 illustrating the receiver mechanism in an energized position to thereby locate the tree in the delimber mechanism.

The receiver mechanism 30, more fully illustrated in FIG. 6, includes a receiver member 50 upon which the base or trunk of the tree is located by the clamp 20 mounted on the boom 16. Receiver member 50 includes a pair of knife edges 52 thereon, as illustrated in FIG. 11, which engage with the trunk of the tree when the tree is placed on the receiver member 50 to position the tree and prevent the trunk of the tree from sliding relative to the receiver member 50. The receiver member 50 is pivotable about the pivot pin 54 to its position shown in FIG. 7 to effect movement of the tree from the receiver mechanism 30 to the delimbing mechanism 34.

The receiver member 50 is pivotable about the pivot pin 54 by means of the fluid cylinder 62. The fluid cylinder 62 includes a piston rod 64 which is attached to the arm 56 of the member 50 by a yoke 60 and a pivot pin 58. The lower end of the cylinder 62 is pivotably supported by a bracket about the pivot pin 70. The pivot pin 70 is supported in a flange 71 disposed on the frame 68 of the machine 10. When the cylinder 62 is pressurized, the piston rod 64 moves axially therefrom to effect movement of the receiver member 50 about the pivot pin 54. The pivotal movement of the receiver member 50 will effect movement of the trunk of the tree from the receiver mechanism 30 to the delimbing mechanism 34.

The delimbing mechanism 34 includes a first delimbing knife 80, a second delimbing knife 82 and a third delimbing knife 84. The delimbing knives 80, 82, and 84 cooperate to effect removal of the limbs from the tree upon relative movement of the tree and the delimbing mechanism 34.

The first delimbing knife 80, illustrated in FIGS. 8–11, includes arcuate knife edges 86 for effecting delimbing of a first portion of the outer circumference of the tree and a horizontally disposed portion 89 which is operable to receive the trunk of the tree from the receiver mechanism 50 when the receiver mechanism is energized to move the tree into the delimbing mechanism. The first delimbing knife 80 assumes the position shown in FIG. 8 during the delimbing operation and does not move during delimbing of the tree as the tree moves relative to the delimbing mechanism 34. The second delimbing knife 82 includes the arcuate knife edges 140 and 142 thereon which cooperate to effect delimbing of spaced apart portions of the outer circumference of the tree as the tree passes therebetween. The delimbing knife 82 is pivotable about the shaft 94 to enable the knife 82 to engage with the tree located in the delimbing mechanism. The third delimbing knife 84 includes arcuate knife edges 88 thereon which also effect delimbing on a portion of the outer circumference of the tree as the tree passes through the delimbing mechanism 34. When the tree is moved from the receiver mechanism 30 to the delimbing mechanism 34, the second and third delimbing knives 82 and 84, respectively, assume the position shown in FIG. 7.

The second and third delimbing knives 82 and 84, respectively, are supported for pivotal movement on the shaft member 94. A linkage 101, illustrated in FIGS. 6 and 12, is operably associated with the second delimbing knife to effect pivotal movement of the second delimbing knife about the shaft 94 to effect engagement of the knife with the outer circumference of the tree. A fluid cylinder 108 is operatively associated with the linkage 101 and includes a piston rod 110 which is pivotably attached to the frame by a pivot pin 112. The other end of the fluid cylinder 108 is pivotably attached to one end of the link members 104 by the pivot pin 106. The link members 104 are supported for rotation about the pivot pins 107 so that when the fluid cylinder 108 is pressurized, clockwise rotation of the link members 104 about the pivot pins 107 will be effected. The links 104 are pivotably attached to link members 100 by pivot pins 102 and the link members 100 are pivotally attached to the base 92 of the second delimbing knife 82 by the pivot pin 98. Thus, actuation of the fluid cylilder 108 effects a clockwise rotation of the link members 104 which moves the pivot pins 102 and the lower end of the link members 100 upwardly and to the left to their positions shown in FIG. 8. Movement of the link members 100 upwardly and to the left, as illustrated in FIG. 6, effects clockwise pivotal movement of the second delimbing knife 82 about the shaft 94 until the blades of the knives engage with the tree.

The pivotal movement of the second delimbing knife about the shaft 94 will effect movement of the base of the tree so that the tree engages witn the knife edges 86 of the first delimbing knife 80. Thus, depending upon the diameter of the tree, the tree will be located somewhere along the horizontal surface 89 of the first delimbing knife 80 after the tree is transferred to the delimbing mechanism by the receiver mechanism 30. The pivotal movement of the second delimbing knife will move the trunk of the tree along the horizontal portion 89 of the first delimbing knife until the tree engages with the knife edges 86 thereof.

Figure 8:
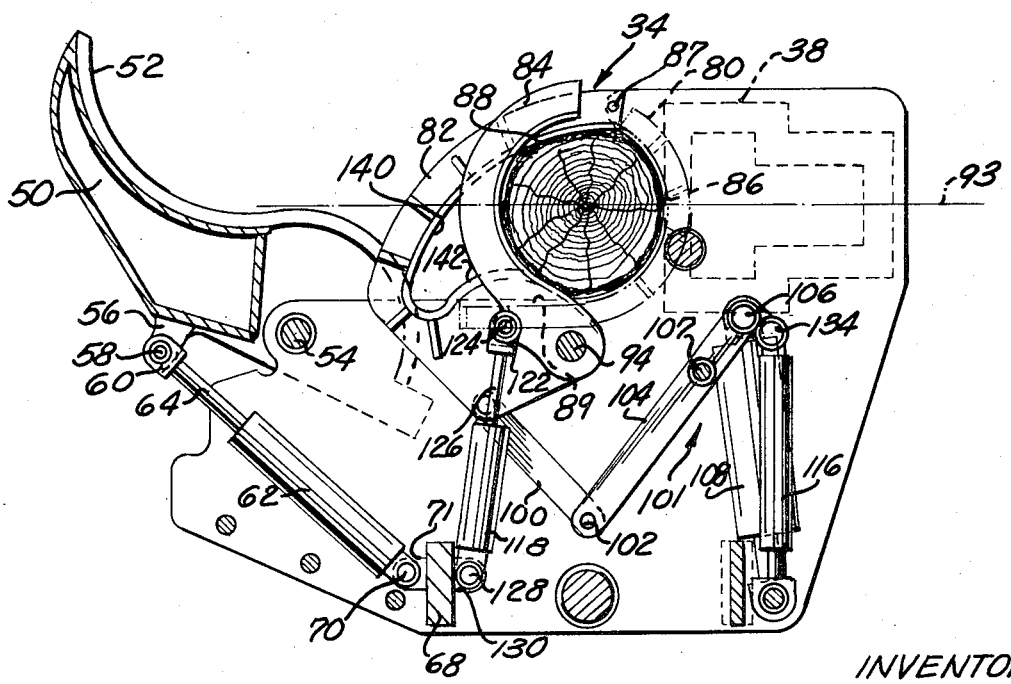
FIG. 8 is a front view of the delimber mechanism showing the delimbing knives in a closed position and engaging the outer circumference of the tree and the tree centered in the delimbing mechanism.
Figure 9:
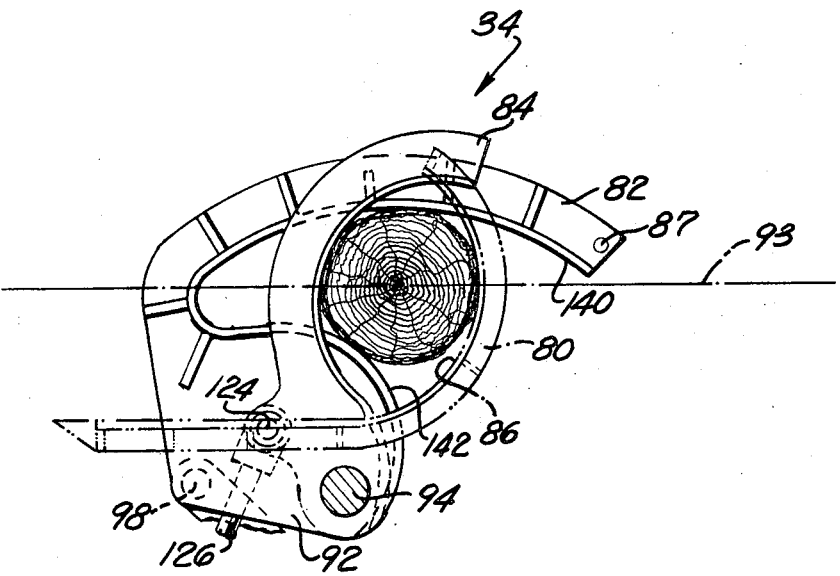
FIG. 9 is a front view of the delimber mechanism of FIG. 8 illustrating only the delimbing knives engaging a tree which has a smaller diameter than the diameter of the tree of FIG. 8 and showing the tree centered in the delimbing mechanism.

When the tree is located in the delimbing mechanism, as shown in FIGS. 8 and 9, the clamping mechanism 40 will engage with the tree and pull the tree through the delimbing knives. As the tree moves through the delimbing knives, the diameter of the portion of the tree engaged in the delimbing mechanism will vary, and more specifically it will normally decrease as the top portion of the tree moves into the delimbing mechanism 34. It is, therefore, necessary to provide means to maintain the delimbing knives in engagement with the outer circumference of the tree as the diameter of the tree varies. To this end, the second delimbing knife 82 is associated with a fluid cylinder 116. The piston rod of the cylinder is pivotally attached to the frame by the pivot pin 112. The opposite end of the cylinder 116 includes a flange portion 132 which is connected by a pivot pin 134 to link member 104 which is fixedly connected to the pivot pin 106. The cylinder 116 when pressurized exerts a force in the downward direction on the pin member 134 which effects rotation of the links 104 in a clockwise direction about the pivot pins 107 to thereby maintain the delimbing knife 82 in engagement with the tree as the diameter of the tree varies. Thus, after the fluid cylinder 108 is pressurized to rotate the second delimbing knife 82 to locate the tree in the delimbing mechanism, the fluid cylinder 108 may be depressurized. The fluid cylinder 116 will then be pressurized to maintain the second delimbing knife in engagement with the tree as the diameter of the portion of the tree in the delimbing mechanism varies.

Another fluid cylinder 118 is operatively associated with the third delimbing knife and is operable to move the third delimbing knife into engagement with the tree. The fluid cylinder 118 is pivotally supported about the pivot pin 128 by the bracket 130 which is supported on a portion of the frame member 68. The cylinder 118 includes a piston rod 126 which has the yoke 122 located on one end thereof and which is pivotally connected by a pivot pin 124 to an arm 120 of the base of the third delimbing knife 84. The cylinder 118 is operable to rotate the knife 84 about the shaft 94 in a clockwise direction to move the third delimbing knife in engagement with the outer circumference of the tree. The fluid cylinder 118 will be energized during the delimbing operation to thereby maintain the third delimbing knife in engagement with the outer circumference of the tree as the diameter of the portion of the tree in the delimbing mechanism varies.

The cylinders 116 and 118 are preferably pressurized after the cylinder 108 moves the tree into engagement with the arcuate portion 86 of the first delimbing knife. The cylinders 116 and 118 are preferably accumulator cylinders so as to act in a spring-like manner to maintain the second and third delimbing knives in engagement with the tree as the diameter of the portion of the tree in the delimbing mechanism varies. It should be apparent that initially the fluid cylinder 108 is pressurized to move the tree into the delimbing mechanism and the cylinders 116 and 118 are pressurized to maintain the delimbing knife in engagement with the tree and the fluid cylinder 108 is depressurized.

The second and third delimbing knives are both rotatable about the shaft 94 and are rotatable relative to each other so as to accommodate trees of various cross-sectional configurations. After a tree has been delimbed and it is desired to open the delimbing mechanism to eject the remnant of the tree, the fluid cylinder 108 is pressurized to extend its piston rod to thereby effect counterclockwise rotation of the second delimbing knife 82 about the shaft 94. The cylinder 108 will overpower the cylinders 116, 118, which act as springs, to effect this movement. Located on the second delimbing knife 82 is a pin member 87 which is operable to engage with the third delimbing knife 84 to thereby effect counterclockwise rotation of the second delimbing knife so as to open the delimbing mechanism 34 to enable the top portion of the tree to be ejected therefrom.

The second delimbing knife 82 is operable to center the longitudinal axis of the tree between the delimbing knives 80, 82 and 84 so as to provide for efficient delimbing of the tree as the tree passes through the delimbing mechanism 34. The centering of the tree between the knives is accomplished by the second delimbing knife 82 locating the longitudinal axis of the tree in a substantially horizontal plane defined by the dotted line 93, as illustrated in FIGS. 6-9.

The centering of the tree in the substantially horizontal center plane 93 is accomplished by the concave surface portion 140 and convex surface portion 142 of the delimbing knife 82. After initial engagement of the tree with the delimbing knife 82 and engagement of the tree with the arcuate portion 86 of the first delimbing knife 80, the delimbing knife 82 will continue to rotate about the shaft 94 as the diameter of the tree decreases. The continued rotation of the delimbing knife 82 will cause the convex portion 142 of the delimbing knife to move upwardly relative to the horizontal plane 93 and the concave surface 140 of the delimbing knife 82 to move downwardly relative to the horizontal plane 93. Thus, as the diameter of the tree varies, the surface portions 140 and 142 of the knife 82 will cooperate to maintain the center of the tree on the horizontal plane 93. Accordingly, it should be apparent that the configuration of the knife 82 is such that as the knife rotates, the convex portion 142 thereof will raise the bottom of the tree relative to the first delimbing knife 80 to thereby maintain the center of the tree in the horizontal plane 93.

As viewed in FIG. 8, when the delimbing knife 82 engages with a tree having a relatively large diameter, the second delimbing knife 82 will not pivot to a large extent about the shaft 94. However, when the delimbing knife 82 engages with a tree having a smaller diameter, as shown in FIG. 9, further rotation of the delimbing knife 82 about the shaft 94 will occur to thereby cause the convex portion 142 of the knife 82 to raise the bottom portion of the tree relative to the horizontal plane 93. Moreover, at the same time, the concave portion 140 of the delimbing knife 82 will engage with the upper portion of the tree and cooperate with the convex portion 142 to maintain the center of the tree in the horizontal plane 93. It should be apparent that the first, second and third delimbing knives cooperate to delimb different arcuate portions of the outer circumference of the tree and that the second delimbing knife cooperates with the first delimbing knife to substantially center the tree along the horizontal plane 93.

Figure 17:
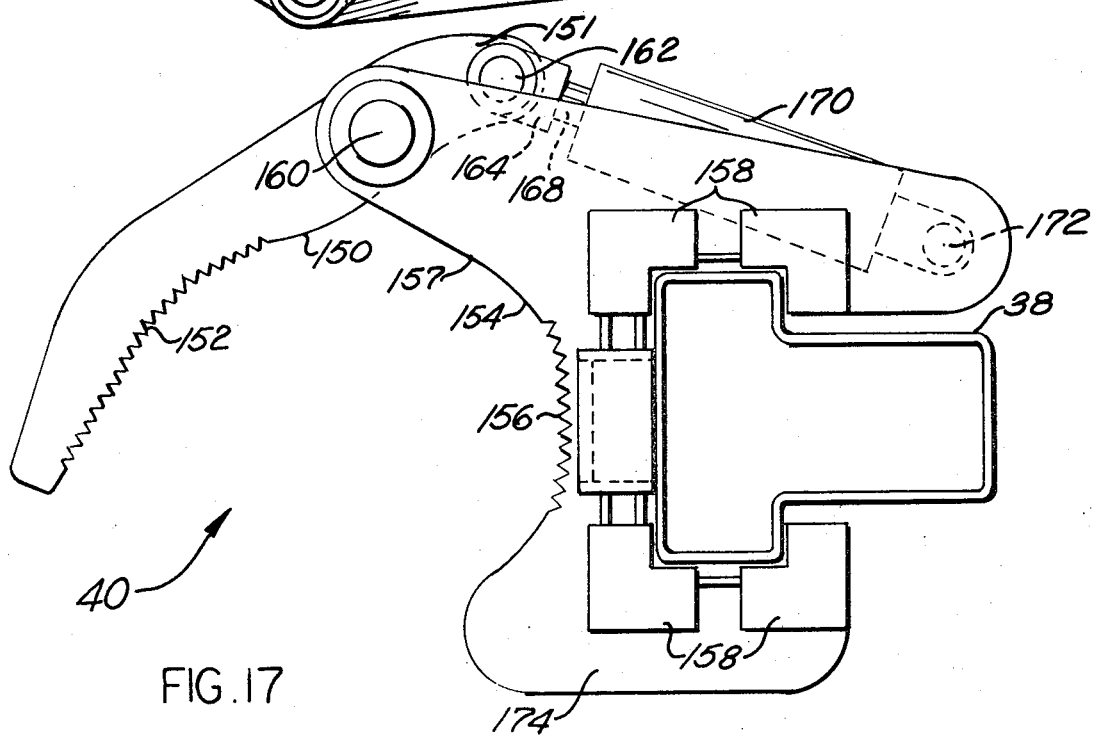
FIG. 17 is a side view taken approximately along line 17—17 of FIG. 13 and illustrating the clamping mechanism for moving the tree relative to the delimbing mechanism.

The delimbing mechanism 34 is mounted on one end of the tree-processing boom 38 which is disposed along one side of the support or vehicle 12. Also located on the boom 38 is the clamping mechanism 40 which is suitably journaled on the boom member 38 by a plurality of bearings 158. The clamping mechanism 40, as illustrated in FIG. 17, includes a first jaw 154 which is formed on a part of the body 174 of the clamp 40. A second jaw member 150 is suitably mounted on a pivot pin 160 which is disposed on an arm 157 of the clamping mechanism 40. The first and second jaw members 150 and 154 include a plurality of teeth 152 and 156, respectively, thereon for gripping a portion of the tree. A fluid cylinder 170 is pivotally supported on the body 174 of the clamping mechanism 40 by a pivot pin 172. The fluid cylinder 170 includes a piston rod 168 having a yoke 164 disposed on one end thereof. The yoke 164 is pivotally connected with an end 151 of the jaw member 150 by a pivot pin 162. When the fluid cylinder 170 is pressurized, the piston rod 168 moves axially therefrom and effects counterclockwise rotation of the second jaw member 150 about the pivot pin 160 to bring the jaw member 150 into engagement with a tree that may be located therebetween. Continued rotation of the jaw member 150 effects engagement of the tree with the first jaw member 154 and the teeth 152 and 156 of the jaw members grip the tree to securely hold the tree therebetween. After the tree is securely gripped by the clamping mechanism 40, the clamping mechanism is moved away from the delimbing mechanism 34 to pull the tree therethrough and effect delimbing of the tree by means to be described hereinbelow.

The cutting mechanism 36 is also mounted on the tree-processing boom 38 and is operable to effect cutting of a tree located between the jaw members thereof. The cutting mechanism 36 includes a pair of jaw members 180 and 182 which are pivotally mounted about the pivot pins 186 and 188, respectively, which are supported by the base 184 of the cutting mechanism 36. The jaws 180 and 182 include blade members 190 and 192, respectively, which are operable to effect cutting of the tree upon rotation of the jaw members.

A fluid cylinder 194 is operatively associated with the jaws and includes a piston rod 196. The piston rod 196 is connected by a pin member 198 to one arm assembly 200 and the cylinder 194 is also pivotally connected by a pin 198 to the other arm assembly 200. Each of the arm assemblies 200 are pivotable about a pivot pin 202. The arm assemblies 200 are pivotally connected at their respective lower ends to the jaws 180 and 182 by pivot pins 204. When the fluid cylinder 194 is pressurized, the arm members 200 are rotated about the pivot pins 202 and the jaw members are rotated about the pivot pins 186 and 188 to enable the blades 190 and 192 to cut a tree located therebetween.

The jaws 180 and 182 include shoulder portions 206 and 208, respectively, which are operable to engage with a pair of stop members 210 and 212, respectively. After a tree has been cut, fluid cylinder 194 will be pressurized to cause the piston rod 196 to move back into the cylinder 194. This will cause the jaw members 180 and 182 to rotate away from each other about the pivot members 186 and 188 until the shoulder portion 206 engages with the stop member 210 and the shoulder portion 208 with the stop member 212. The engagement of the shoulder portion with the stop members will prevent further rotation of the jaw members 180 and 182 and provide for positive positioning of the jaw members 180 and 182.

Figure 13:
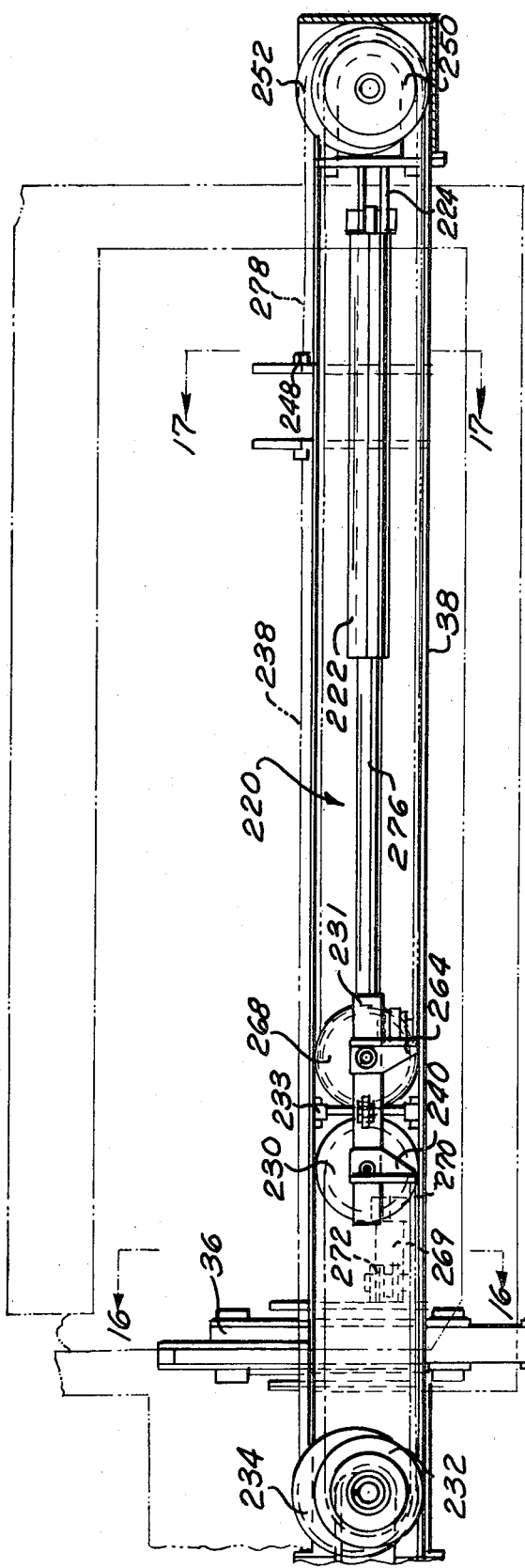
FIG. 13 is a top view of the tree-processing boom illustrating the clamping mechanism and the cutting mechanism in a position located away from the delimbing mechanism.
Figure 14:
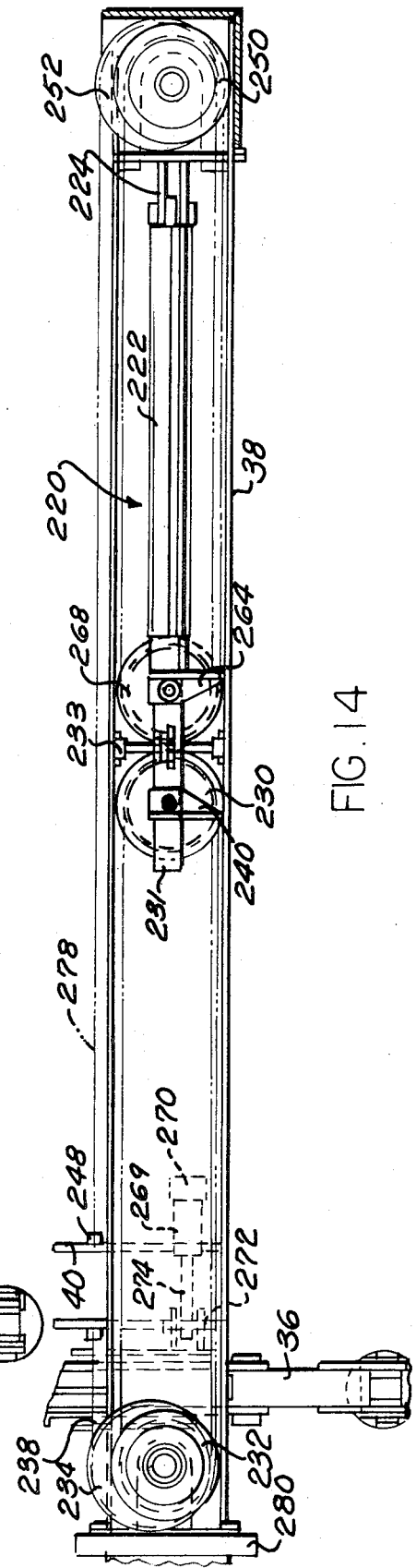
FIG. 14 is a top view of the tree-processing boom of FIG. 13 and showing the clamping and cutting mechanism moved toward the delimbing mechanism.

The clamping mechanism 40 is mounted on the tree-processing boom 38 for movement toward and away from the delimbing mechanism 34 by a fluid cylinder and pulley mechanism, generally designated 220 in FIGS. 13 and 14. The mechanism includes a fluid cylinder 222 which is secured by a yoke 224 to the boom 38. The fluid cylinder 222 includes a piston rod 276 which is operatively connected to a carriage 231 at one end thereof. The carriage 231 supports a pair of pulleys 230 and 268 and includes a guide means 233 for guiding the axial reciprocal movement of the piston rod 276 and the carriage 231 in the boom mechanism 38. Located at one end of the boom mechanism 38 is a pair of pulley members 232 and 234. A cable 238 is suitably attached to one side of the clamping mechanism 40, around the lower pulley 234 and around the pulley member 230 which is supported by the carriage 231. The cable 238 then extends around the upper pulley 232 and is connected to a bracket 240 supported on the carriage mechanism 231. When the fluid cylinder 222 is pressurized to move the clamping mechanism 40 toward the delimbing mechanism 34, the piston rod 276 moves inwardly of the cylinder 222 to thereby move the carriage 231 away from the delimbing mechanism 34. Movement of the carriage away from the delimbing mechanism 34 causes the cable 238 to pull the clamping mechanism 40 toward the delimbing mechanism 34 to the position shown in FIG. 14.

Located on the boom at the end away from the delimbing mechanism 34 is a pair of pulley members 250 and 252. Attached to the clamping mechanism 40 by a suitable fastener 248 is a cable 278 which extends around the lower pulley member 252, around the pulley member 268 supported on the carriage 231, and around the upper pulley member 250. The cable 278 then extends to the carriage 231 and is suitably attached to a bracket 264 supported on the carriage member 231. When the fluid cylinder 222 is pressurized to effect movement of the clamping mechanism 40 away from the delimbing mechanism 34, the cylinder 222 is pressurized to effect movement of the piston rod outwardly therefrom. Movement of the piston rod 276 outwardly from the cylinder 222 effects movement of the carriage 231 toward the delimber mechanism 34. Movement of the carriage 231 toward the delimbing mechanism 34 causes the cable 278 to pull the clamping mechanism 40 away from the delimbing mechanism 34 to its position illustrated in FIG. 13. Movement of the clamping mechanism 40 away from the delimbing mechanism 34 will enable the clamping mechanism 40 to pull a tree which is gripped by the jaws thereon through the delimbing mechanism 34 to thereby effect delimbing of the tree.

When the clamping mechanism 40 is moved toward the delimbing mechanism 34 to engage with a portion of the tree in the delimbing mechanism 34, the cutting mechanism 36 is also moved toward the delimbing mechanism 34. The means for moving the cutting mechanism 36 toward the delimbing mechanism 34 includes a fluid cylinder 269 which is secured to the bottom of the boom member 38 by the bracket 270. The fluid cylinder 269 includes a piston rod 274 which is suitably attached to the bottom of the cutting mechanism 36 by a bracket 272. When the fluid cylinder 269 is pressurized to effect axial movement of the piston rod 274 therefrom, the cutting mechanism 36 is moved toward the delimbing mechanism 34 to its position shown in FIGS. 14 and 15. When the fluid cylinder 269 is pressurized on the opposite side, the piston rod 274 moves inwardly of the cylinder 269 to effect movement of the cutting mechanism 236 away from the delimbing mechanism 34 to its position shown in FIG. 13.

The fluid cylinder 222 and the fluid cylinder 269 are interconnected by suitable hydraulics so that actuation of the fluid cylinder 222 to effect movement of the clamping mechanism 40 toward the delimbing mechanism 34 will also effect actuation of the fluid cylinder 269 to effect energization of the cutting mechanism 36 toward the delimbing mechanism 34. Conversely the hydraulic system also provides that actuation of the fluid cylinder 222 to effect movement of the clamping mechanism 40 away from the delimbing mechanism 34 will also effect actuation of the fluid cylinder 269 to effect movement of the cutting mechanism 36 away from the delimbing mechanism 34.

The operation of the cutting and clamping mechanisms enables the boom mechanism 38 to have a reduced overall length. The reduction in overall length of the boom 38 is due to the fact that both the cutting mechansim 36 and the clamping mechanism 40 are operable to move along the length of the boom. In one known prior art short wood harvester, the cutting mechanism was fixed on the boom and the clamping mechanism moved outwardly from the boom along the tree to engage with the tree and then pull the tree along the boom. Thus, in that known prior art harvester the overall length of the boom and the cutting mechanism associated therewith was such as to necessitate having a relatively open area surrounding the vehicle to enable the processing apparatus to work properly. In the Busch tree harvester, the cutting mechanism and the delimbing mechanism are fixed relative to each other and the clamping mechanism is located therebetween for movement toward and away from the delimbing mechanism. This construction also results in the harvester having a large overall length due to the fact that the bunk mechanism is located behind the cutting mechanism so as to receive the bolts of the tree dropped therefrom. Therefore, the Busch tree harvester is not easily adaptable to operate in confined quarters. Since the present processing apparatus utilizes clamping, cutting, and delimbing mechanisms which have a reduced overall length, the tree harvester may be used in relatively confined quarters. The provision of allowing the cutting mechanism 36 to move toward the delimbing mechanism 34 enables the clamping mechanism 40 to move toward the delimbing mechanism 34 and enables the clamping mechanism 40 to be disposed on one side of the cutting mechanism and the delimbing mechanism to be disposed on the other side. This construction allows bolts of a fixed length to be cut from the tree by apparatus which has a length which is only a little longer than the predetermined length of the bolts to be cut from the tree. Thus, it should be apparent that the construction and movement of the clamping mechanism and the cutting mechanism facilitate the operation of the tree-processing apparatus in heavy overgrowth and thick stands of trees and thus exhibits a substantial advantage over the prior art.

Figure 15:
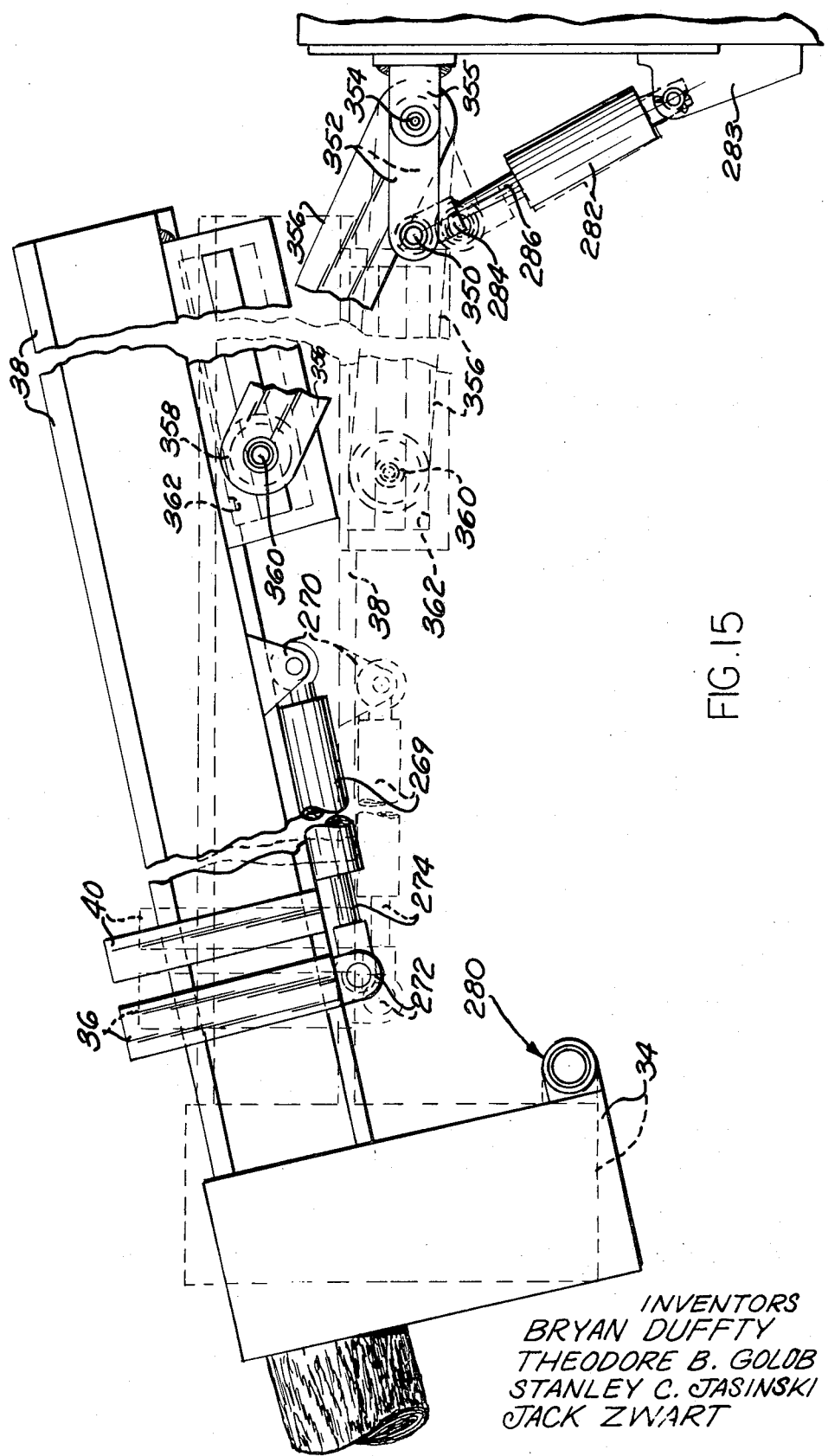
FIG. 15 is a side view of the tree-processing boom more fully illustrating the construction thereof and the counterbalancing means and showing the boom in a position to which it has been pivoted in response to the weight of the tree located in the delimbing mechanism.
Figure 16:
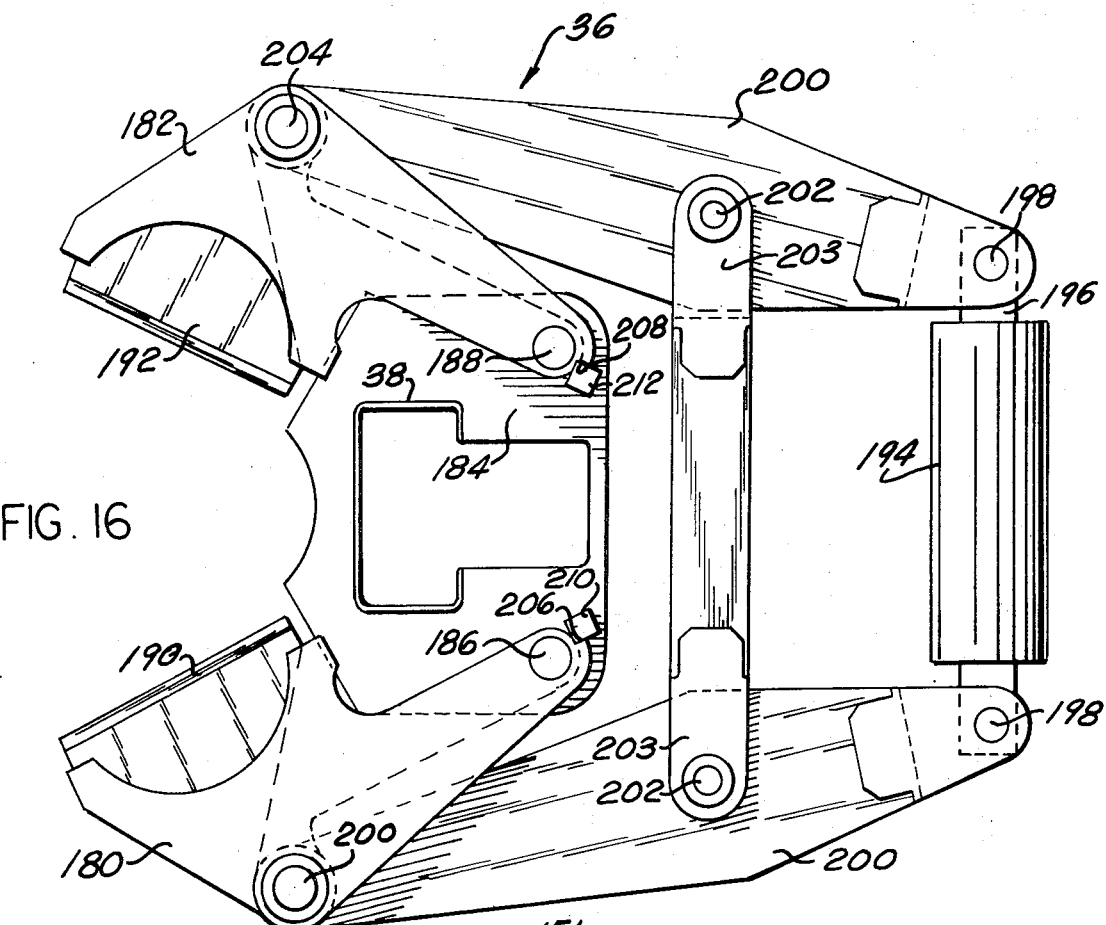
FIG. 16 is a side view taken approximately along line 16—16 of FIG. 13 and showing the cutting mechanism for cutting the tree into bolts of a predetermined length.

To facilitate operation of the clamping mechanism and cutting mechanism, the boom mechanism 38 is pivotally supported about a shaft 280 which is secured to the support or vehicle 12. Operatively associated with the boom 38 is a fluid cylinder 282 which when pressurized counteracts the mass of the boom so that the boom acts as a substantially balanced body. This enables the boom to pivot about shaft 280 to thereby assume a position which is substantially parallel to the position assumed by the tree, as illustrated in FIG. 15. The fluid cylinder 282 is pivotally supported on the frame of the tree harvester by a bracket 283. The fluid cylinder 282 includes a piston rod 286 which is operable to move axially from the cylinder 282 when the cylinder 282 is pressurized. A yoke 284 secures one end of the piston rod 286 to a shaft 350. A link 352 is rotatably supported on the shaft 350 and is rigidly supported at its other end by a rotatable shaft 354. The rotatable shaft 354 is supported by a bracket 355 disposed on the frame of the tree harvester and the one end of link 352 is welded thereto. Thus, when the fluid cylinder 282 is pressurized, the shaft 350 will be moved and cause the link 352 to rotate. Since the link 352 is welded to the shaft 354, rotation of one end of the link will effect rotation of the shaft 354 relative to the bracket 355.

Rigidly secured to the shaft 354 is a link 356 which is rotatable relative to the bracket 355 upon rotation of the shaft 354. The link 356 is also welded to the shaft and supports a roller 358 at the opposite end thereof. The roller 358 is supported on a pin 360 which is secured on the link 356 and runs in a roller track 362 which is disposed on the tree processing boom 38. Actuation of the fluid cylinder 282 effects rotation of the shaft 354 which effects pivotal movement of the link 356. When the link 356 pivots, the roller 358 moves along the roller track 362 to thereby pivot the tree-processing boom about the shaft 280. It should be apparent that link 356 has a fixed length and pivots about the shaft 354 to thereby move the roller 358 along the roller track 362 in either an upwardly or a downwardly direction to effect pivotal movement of the tree-processing boom 38 about the shaft 280.

The fluid cylinder 282 acts like a spring to bias the boom 38 and to hold the boom in a substantially horizontal position, as illustrated in dotted lines in FIG. 15, when a tree is not engaged therewith. When a tree is located in the delimbing mechanism 34, the boom will pivot in a counterclockwise direction about the shaft 280 to assume a position which is parallel to the direction the tree extends from the delimbing mechanism, as illustrated in FIG. 15 in full lines. When the tree is pulled through the delimbing mechanism 34 by the clamping mechanism 40, the boom will tend to pivot in a clockwise direction, as viewed in FIG. 15, about the shaft 280. The arc through which the boom 38 pivots will be dependent upon where the center of gravity of the tree can be controlled by the fluid cylinder 282.

The pivotal movement of the boom 38 allows the boom 38 to extend in a direction which is parallel to the direction in which the tree extends from the delimbing mechanism 34. This will allow the tree to be centered in the delimbing mechanism 34, the clamping mechanism 40 and the cutting mechanism 36. This centering of the tree by the pivotal movement of the boom will tend to reduce the horizontal or axial forces exerted by the weight of the tree on the delimbing mechanism, the cutting mechanism and the clamping mechanism.

From the foregoing, it should be apparent that the tree will be moved relative to the delimbing mechanism 34 by the clamping mechanism 40 and a plurality of bolts will be cut therefrom by the cutting mechanism 36. The clamping mechanism 40 will continue to move toward and away from the delimbing mechanism 34 to sequentially pull portions of the tree through the delimbing mechanism 34. It should be apparent that the hereinabove described construction exhibits a distinct advantage in that it provides for efficient operation of the delimbing and cutting cycles. This is due to the fact that initial movement of the clamping mechanism away from the delimbing mechanism effects delimbing of a first portion of the tree which is then cut by the cutting mechanism 36. A second movement of the clamping mechanism away from the delimbing mechanism effects delimbing of a second portion of the tree and cutting of a second bolt of a predetermined length by the cutting mechanism 36. Accordingly, every stroke of the clamping mechanism 40 along the boom 38 away from the delimbing mechanism 34 will effect delimbing of a portion of the tree and a cutting of a bolt of a predetermined length therefrom. This is a distinct advantage over the prior art in that wasted strokes of the clamping mechanism do no occur in the present invention.

The clamping mechanism will continue to pull the tree through the delimbing mechanism until the diameter of the tree, which is engaged in the delimbing mechanism, reaches a predetermined diameter. When the portion of the tree in the delimbing mechanism 34 is below a predetermined diameter, a sensing mechanism in the form of a limit valve LS-5, FIG. 22, will effect ejectment of the remnant of the tree or top portion thereof from the delimbing mechanism 34 to be described hereinbelow. The sensing mechanism, as illustrated in FIG. 21, includes the limit valve LS-5 disposed adjacent the shaft 94 which rotates with the second delimbing knife 82. Located on the shaft 94 is a cam 310 which is operable to engage with and actuate the valve LS-5. Thus, when the second delimbing knife 82 pivots through a predetermined arc, the valve LS-5 will be actuated to effect actuation of the ejector mechanism. The arc through which the second delimbing knife 82 pivots will be the same as the arc through which the shaft 94 pivots and it should be apparent that the arc will be directly proportional to the diameter of the tree in the delimbing mechanism 34. Thus, when the tree diameter is below a critical diameter, which may preferably be approximately 3 inches, the sensing mechanism will effect energization of the ejector mechanism.

Figure 10:
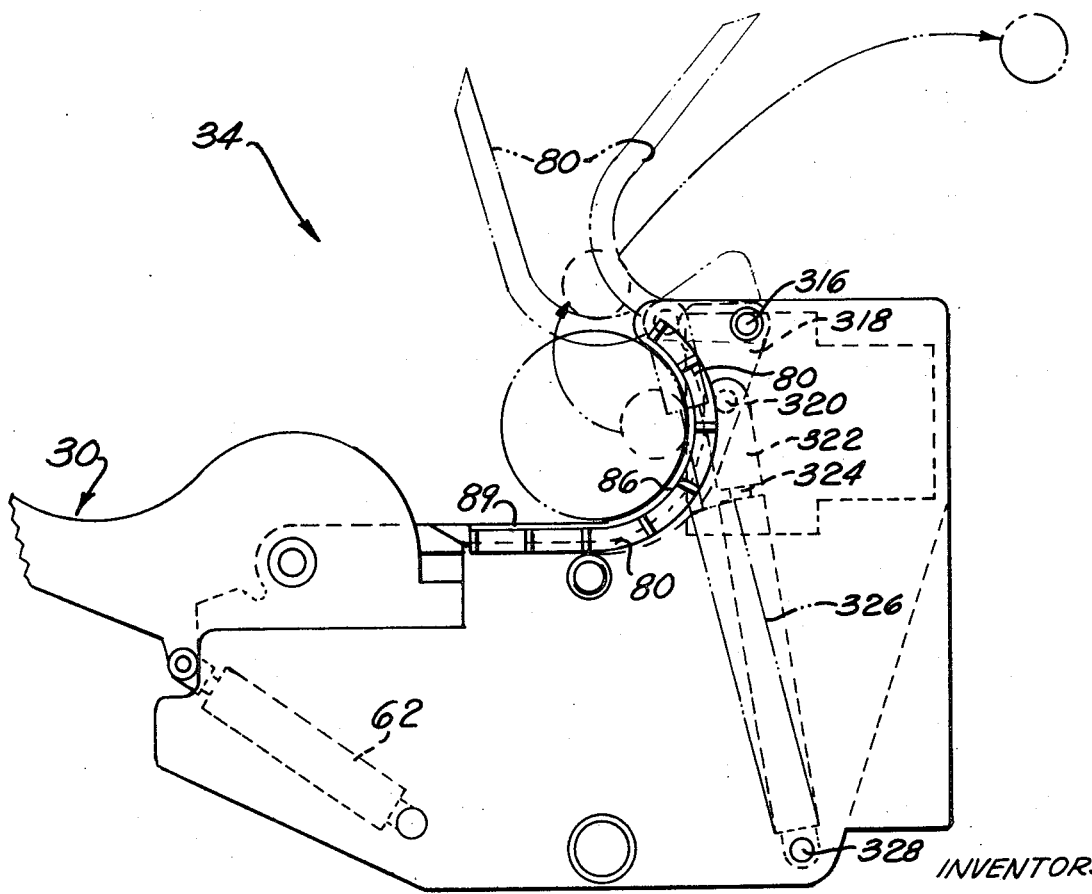
FIG. 10 is a front view of the delimber mechanism taken along the line 10—10 of FIG. 1 showing the first delimber knife or ejector actuated to thereby eject the remnant of the tree from the delimbing mechanism.

The ejector mechanism includes the first delimbing knife 80 and a fluid cylinder 326 for effecting rotation of the delimbing knife 80 in a clockwise direction, as illustrated in dotted lines in FIG. 10, to thereby eject the top of the tree from the delimbing mechanism 34. The first delimbing knife 80 includes a base 318 which is pivotally attached to the frame of the support 12 by a pivot pin 316. The fluid cylinder 326 includes a piston rod 324 having a yoke 322 on one end thereof which is pivotally attached to the base 318 of the first delimbing knife by a pin 320. The fluid cylinder 326 is pivotally supported on the frame of the tree harvester by a pivot pin 328. When the fluid cylinder 326 is pressurized, the piston rod 324 will move axially therefrom to effect rapid pivotal movement of the first delimbing knife about the pivot pin 316. This will effect ejectment of the top of the tree which is resting on the first delimbing knife from the delimbing mechanism 34. It should be noted that the ejector mechanism is only energized when the diameter of the tree is below a predetermined diameter. This will normally occur after a plurality of bolts of a predetermined length have been cut from the tree by the cutting mechanism 36.

Figure 18:
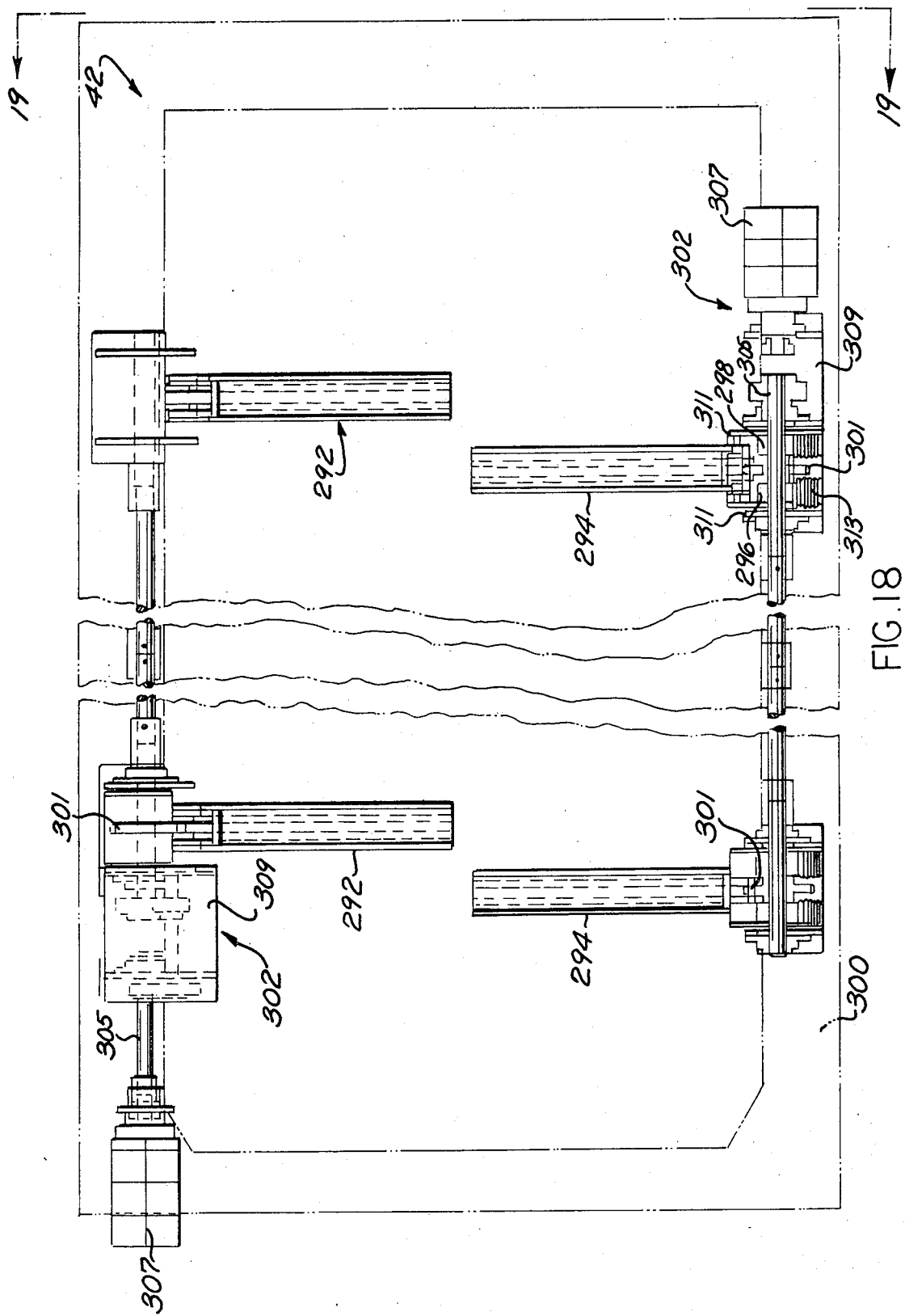
FIG. 18 is a top view of the bunk mechanism for storing the bolts of the tree.
Figure 19:
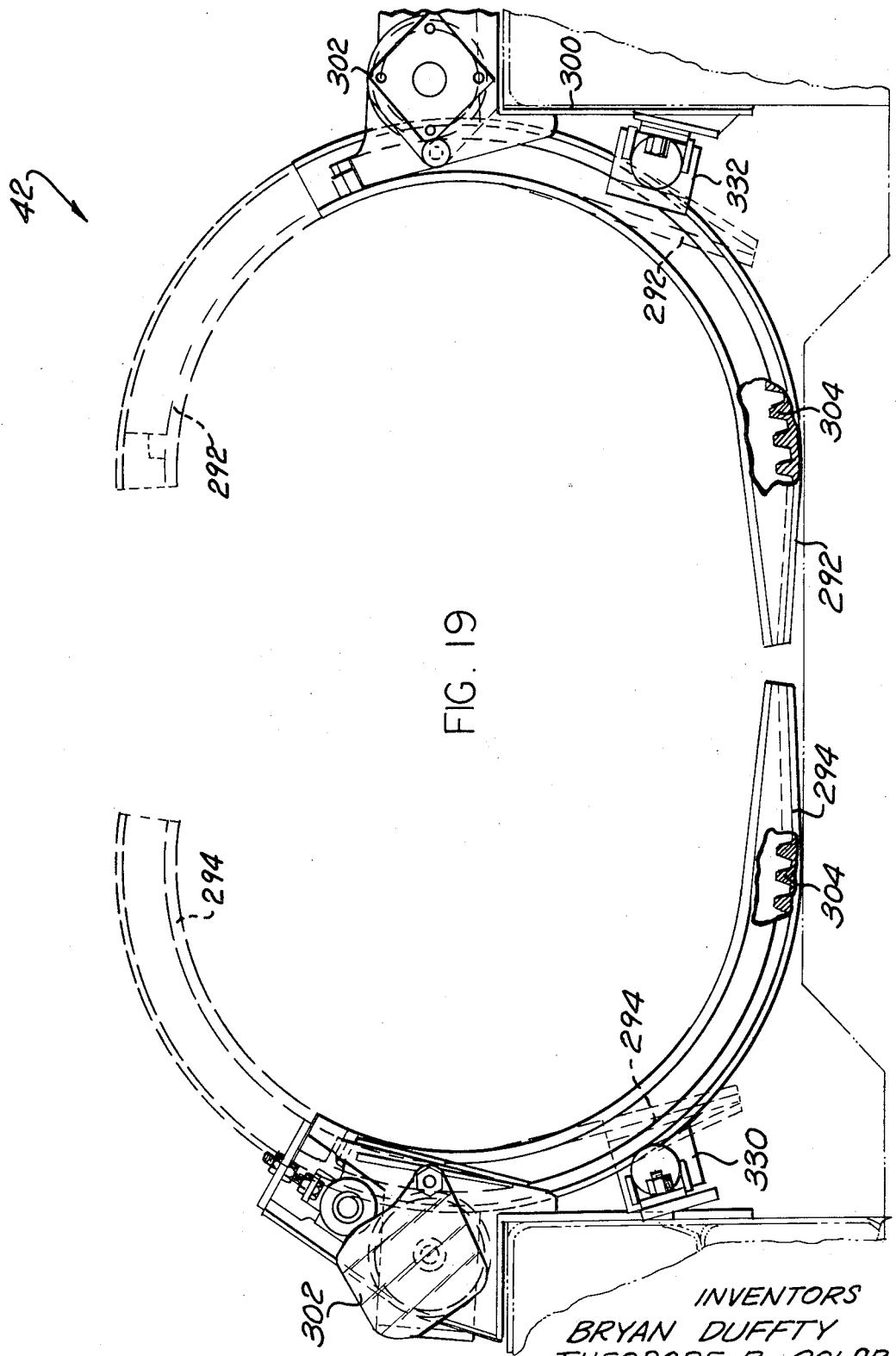
FIG. 19 is a rear view of the bunk mechanism taken approximately along the line 19—19 of FIG. 18 and showing the arcuate arms in a closed position in full lines and showing the arms in an open position in dotted lines.

The bolts that are cut from the tree are deposited in the bunk mechanism 42 for storage therein. The bunk mechanism 42, as illustrated in FIGS. 18 and 19 includes a support or frame 300 upon which pairs of arcuate arm members 292 and 294 are supported. Associated with each of the arm members 292 and 294 are support flanges 330 and 332 which engage with the undersides of the arcuate arm members to support the arcuate arm members and guide movement of the arms when the bunk mechanism is opened.

A mechanism 302 is provided to move the arcuate arm members 292 and 294 endwise in an arcuate path in an upward direction relative to the support 300. Rotation of the sprocket 301, when it is engaged with pins 304, effects raising and lowering of the arm members 292 and 294. The pins 304 are suitably attached to the arm members 292 and 294 so that movement thereof by the sprocket 301 will effect an endwise arcuate movement of the arm members 292 and 294 to their position shown in phantom lines in FIG. 19. It should be apparent that movement of the arcuate arm members 292 znd 294 in an upwardly endwise direction will effect dumping of the logs which are disposed in the bunk mechanism 42.

Figure 20:
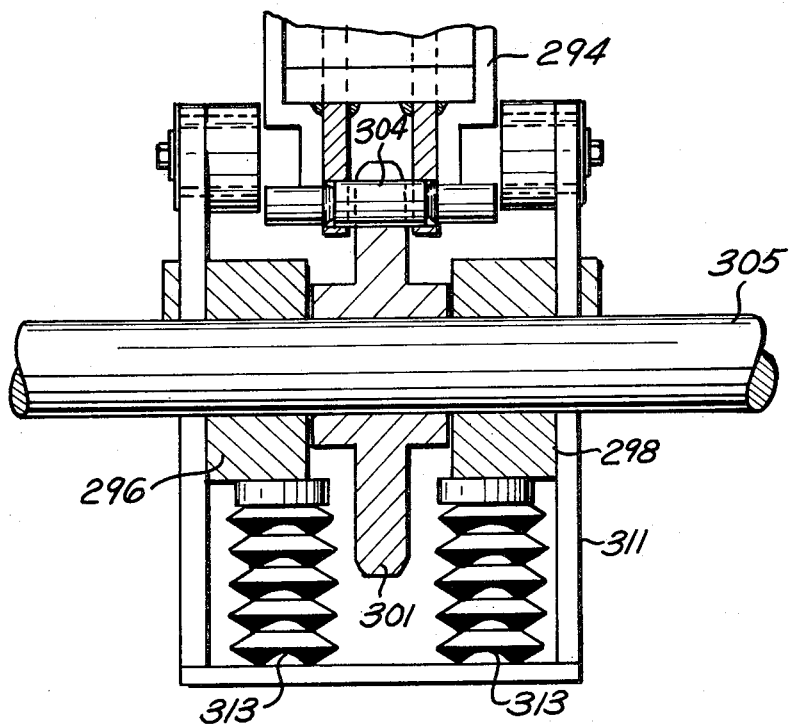
FIG. 20 is a fragmentary sectional view of the means for absorbing the shock of the bolts when they fall from the cutting mechanism onto the arcuate arms of the bunk mechanism.

The sprockets 301 are disposed on a shaft 305 and a suitable drive mechanism which may preferably include a motor 307 is operatively connected with the shaft 305 to effect rotation thereof. While the shaft 305 is rigidly supported by the frame of the tree harvester, the arm members are supported relative to the sprockets 301 by brackets 311 which extend around the shaft 305, as illustrated in FIG. 20. A pair of collars 296 and 298 are disposed on the shaft and shock absorbers 313 are disposed between the bracket 311 and the collars 296 and 298 to prevent damage to the shaft 305 when a bolt falls on the arm members. This enables the arcuate are members to move slightly about the shaft 305 when a bolt is dropped on the arms. Thus, the shock of a dropping bolt is absorbed by the shock absorbers to thereby prevent damage to the mechanism for raising and lowering the arcuate arm members 292 and 294.

The endwise movement of the arcuate arm memgers 292 and 294 provides a distinct advantage in effecting dumping of the logs from the bunk mechanism 42 in that the logs are rolled by the arcuate movement of the arm members when the bunk mechanism is opened. This is very important in that the bolts that are stored in the bunk mechanism 42 might have slight burrs thereon which might tend to wedge the bolts together when the bolts are dropped in the bunk mechanism so that when the bottom of the bunk mechanism is opened, the bolts will not fall therefrom. The arm members, however, tend to roll the bolts out of the bunk mechanism and will disengage the logs from each other if the bolts are stuck together by the burrs thereon. It should also be noted that the weight of the bolts in the bunk mechanism does not act in a direction which tends to open the bunk mechanism. Therefore, the chance of inadvertent opening of the bunk mechanism is reduced. Moreover, since the weight of the bolts does not act in the direction to open the bunk mechanism, the opening of the bunk mechanism can be more fully controlled and the weight of the bolts will not effect a jarring opening of the mechanism as is known in other types of bunk mechanisms. Thus, it should be apparent that this is a great improvement in the art in that a reliable dumping mechanism for the dumping of bolts has been provided which prevents bolts from becoming wedged in the bunk mechanism and which reduces the possibility of damage to the bunk mechanism when the bolts are dumped therefrom.

The sequence of operation of the tree-processing mechanism, as illustrated in FIG. 21, and the control means for controlling the sequence of operation, as illustrated in FIG. 22, will now be described hereinbelow. When it is desired to process a tree in a tree-processing apparatus, the tree is placed in the receiver mechanism and a start button is pressed by the operator of the machine. When the start switch is thrown, the cylinders 108 and 326 associated with the second delimbing knife and the first delimbing or ejector knife are pressurized to make sure that the delimbing mechanism is open and the ejector knife is in a down position. The open condition of the delimbing mechanism will be sensed by the limit valve LS-10. If the ejector is in a down position and the delimbing mechanism is in an open position, the operator will be able to manually energize the receiver mechanism 30 to move the receiver up to thereby transfer the tree located thereon to the delimbing mechanism 34. When the receiver mechanism is energized and is transferring the tree to the delimbing mechanism, the cylinders associated with the delimbing mdchanism will be continuously pressurized to hold the delimbing mechanism open. When the receiver reaches its fully up position and the tree falls therefrom onto the delimbing mechanism, limit valve LS-1 which is associated with the receiver mechanism is energized to effect closing of the delimbing mechanism and movement of the receiver mechanism to its down position. The delimbing mechanism will then close around a tree located therein and when the trunk of the tree is fully clamped, the limit valve LS-2 which is associated therewith will be energized by movement thereof and will energize the means for moving the clamping mechanism and the cutting mechanism toward the delimbing mechanism, as schematically illustrated in FIG. 21. The clamping mechanism will move toward the delimbing mechanism until it engages with the limit valve LS-6 which will cause the clamping mechanism to close about the trunk of the tree located in the delimbing mechanism. When the clamping mechanism is fully closed, a limit valve LS-7 will be closed and will energize the means for moving the clamping mechanism and the cutting mechanism away from the delimbing mechanism. The clamping mechanism will continue to move along the tree-processing boom until the clamping mechanism energizes limit valve LS-8 which will indicate that the clamping mechanism has moved to the end of the boom and has pulled a portion of the tree through the delimbing mechanism. Closing of the limit valve LS-8 will effect energization of the cutting mechanism to thereby cut a bolt of a predetermined length from the tree. A limit valve LS-9 which is associated with a cutting mechanism will be energized when the cutting mechanism is fully closed. When the limit valve LS-9 is energized, the cutting mechanism and the clamping mechanism will be opened, as schematically illustrated in FIG. 21, to allow the bolt of the tree to drop into the bunk mechanism. The diameter of the portion of the tree in the delimbing mechanism is then sensed by limit valve LS-5. If the diameter of the tree is greater than the predetermined diameter, the clamping and cutting mechanisms will be moved toward the delimbing mechanism to start the cycle again to thereby delimb another portion of the tree and cut another bolt therefrom.

If the limit valve LS-5 senses that the diameter of the portion of the tree in the delimbing mechanism is below a predetermined diameter, the delimber mechanism opens. This is effected by providing a valve, not shown, which responds to the valve LS-5 and redirects the fluid flow to terminate the tree-processing cycle and effect opening of the delimbing mechanism. When the delimbing mechanism is fully opened, as sensed by the limit valve LS-10, the ejector mechanism will be energized and the ejector blade will be moved upwardly to effect ejectment of the remnant of the tree from the delimbing mechanism. When the ejector blade moves to its fully rotated position to eject the remnant of the tree therefrom, the limit valve LS-11 will sense that the ejector has ejected the remnant of the tree and will energize the cylinder to move the ejector blade to its down position, as schematically illustrated in FIG. 21. When this occurs, the tree-processing apparatus will be shut off and a new tree may be placed upon the receiver mechanism by the operator of the tree-processing apparatus.

While no specific hydraulic system has been disclosed hereinabove, the specific design of any system would be clearly within the ordinary skill of one knowledgeable in the art, and, therefore, the specific system has not been disclosed herein.

From the foregoing, it should be apparent that a new and improved apparatus for harvesting trees has been provided. The apparatus includes a receiver mechanism for receiving a felled tree thereon. The receiver mechanism is energized and moves the base of the tree which is located thereon into a delimbing mechanism. When the tree is located in the delimbimg mechanism, the jaws on the delimbing mechanism close and the tree-processing boom upon which the delimbing mechanism is mounted pivots so that it assumes an angular relationship which is substantially parallel to the direction from which the tree extends from the delimbing mechanism. A clamping mechanism mounted on the boom mechanism then moves toward the delimbing mechanism to engage the portion of the tree therein. A cutting mechanism which is mounted on the boom between the clamping and delimbing mechanisms moves toward the delimbing mechanism upon movement of the clamping mechanism toward the delimbing mechanism. The clamping mechanism then engages the tree and pulls the tree away from the delimbing mechanism and through the delimbing knives thereof so that a portion of the tree is delimbed. The portion of the tree that is delimbed is then cut into a bolt of a predetermined length by the cutting mechanism and dropped into a bunk mechanism. The process is repeated until a plurality of bolts have been cut from the tree and dropped into a bunk mechanism and a sensing device senses the diameter of the portion of the tree in the delimbing mechanism to be below a predetermined diameter. When this occurs, the sensing mechanism effects ejectment of the remnant of the tree, which is the portion of the tree which is below the predetermined diameter, from the delimbing mechanism. While the tree is being processed, another tree may be felled by another boom having a clamp and a shear mounted thereon and located in the receiver in a ready position so that when the first tree is ejected from the delimbing mechanism, the second tree will be ready to be received therein.

What we claim is:

1. Apparatus for processing trees comprising a support, tree-processing means carried by said support, said tree-processing means including a delimbing mechanism for effecting delimbing of the tree upon relative movement of the tree and said delimbing mechanism, a tree-clamping mechanism for engaging the tree, means for moving said tree clamping means toward and away from said delimbing mechanism, a tree-cutting mechanism located between said clamping mechanism and said delimbing mechanism for cutting predetermined lengths from the tree after delimbing thereof, and means for moving Said tree-cutting mechanism toward and away from said delimbing mechanism which are responsive to movement of said clamping mechanism relative to said delimbing mechanism so that said cutting mechanism moves toward said delimbing mechanism when said clamping mechanism moves toward said delimbing mechanism and said cutting mechanism moves away from said delimbing mechanism when said clamping mechanism moves away from said delimbing mechanism.

2. Apparatus for processing trees as defined in claim 1 further including a tree-processing boom carried by said support and which is operable to support said delimbing mechanism, said tree-clamping mechanism and said tree-cutting mechanism thereon.

3. Apparatus for processing trees as defined in claim 1 further including a bunk mechanism which is operable to receive and store a plurality of bolts which have been cut from the tree after delimbing thereof.

4. Apparatus for processing trees as defined in claim 2 wherein said tree-processing boom is pivotable relative to said support so as to assume a position which is substantially parallel to a tree which is disposed in said delimbing mechanism.

5. Apparatus for processing trees as defined in claim 1 further including sensing means for sensing the diameter of a portion of the tree which is being processed by said tree-processing means and ejector means responsive to said sensing means for ejecting the remnant of the tree from said delimbing mechanism when said sensing means senses the diameter of the tree to be below a predetermined diameter.

6. Apparatus for processing trees as defined in claim 1 wherein said support comprises a self-propelled vehicle.

7. Apparatus for processing trees as defined in claim 6 further including a boom having a shear and a clamp thereon for respectively cutting and gripping a standing tree to thereby fell the tree and being operable to grip the felled tree and transfer the tree to said tree-processing means.

8. Apparatus for harvesting trees comprising a support, a delimbing mechanism carried by the support for delimbing a tree, a cutting mechanism carried by the support for cutting a tree into bolts of a predetermined length, a clamping mechanism for clamping a tree and moving the tree relative to said delimbing mechanism to effect delimbing thereof and positioning the tree relative to said cutting mechanism to enable said cutting mechanism to cut the tree into bolts of a predetermined length, said cutting mechanism being interposed between said delimbing mechanism and said clamping mechanism, means mounting said clamping mechanism for movement relative to said support, means for effecting movement of said clamping mechanism relative to said support toward said delimbing mechanism to engage the tree and away from said delimbing mechanism to advance the tree through said delimbing mechanism and relative to said cutting mechanism, means mounting said cutting mechanism for movement relative to said support, and means for effecting movement of said cutting mechanism toward said delimbing mechanism responsive to movement of said clamping mechanism toward said delimbing mechanism.

9. Apparatus for harvesting trees as defined in claim 8 further including a tree-processing boom carried by said support and which is operable to support said delimbing mechanism, said cutting mechanism and said clamping mechanism.

10. Apparatus for harvesting trees as defined in claim 9 wherein said tree-processing boom is pivotable relative to said support so as to assume a position which is substantially parallel to the position of a tree received in said delimbing mechanism.

11. Apparatus for harvesting trees as defined in claim 10 further including means for biasing said boom about the pivot point thereof so that said tree-processing boom acts substantially like a massless body when it pivots about said pivot point to assume a position which is substantially parallel to a tree received in said delimbing mechanism.

12. Apparatus for harvesting trees as defined in claim 8 further including sensing means for sensing the diameter of the portion of a tree located in said delimbing mechanism and ejector means which are operable to eject the remnant of the tree from the delimbing mechanism when said sensing means senses the diameter of the tree to be below a predetermined diameter.

13. Apparatus for harvesting trees as defined in claim 8 wherein said means for effecting movement of said clamping mechanism toward and away from said delimbing mechanism includes fluid power means and a pulley-cable arrangement which is operatively associated with said clamping mechanism, said fluid power means being operable to effect movement of said pulley-cable arrangement to thereby effect movement of said clamping means toward and away from said delimbing mechanism.

14. Apparatus for harvesting trees as defined in claim 8 wherein said means for effecting movement of said cutting mechanism toward said delimbing mechanism includes fluid power means for moving said cutting mechanism toward and away from said delimbing mechanism.

15. Apparatus for harvesting trees as defined in claim 8 further including a bunk mechanism which is operable to receive and store a plurality of bolts therein after delimbing thereof.

16. Apparatus for harvesting trees as defined in claim 8 further including a receiver mechanism which is operable to receive a felled tree and locate the trunk of the felled tree in said delimbing mechanism.

17. Apparatus for harvesting trees as defined in claim 16 wherein said support comprises a self-propelled vehicle which has a boom mechanism thereon for engaging with a felled tree and moving the felled tree to said receiver mechanism.

18. Apparatus for use in harvesting trees comprising a delimbing mechanism for delimbing a felled tree upon relative movement between the tree and the delimbing mechanism, said delimbing mechanism including a first delimbing knife for delimbing a first portion of the outer circumference of the tree, a second delimbing knife for delimbing at least a second portion of the outer circumference of the tree, and means for effecting movement of said second delimbing knife into engagement with the tree and for maintaining said second delimbing knife in engagement with the tree as the diameter of the portion of the tree with which it is engaged varies; said second delimbing knife having a concave surface formed thereon for engaging a first portion of the tree and a convex surface formed thereon for engaging another portion of the tree, engagement of said concave and convex surfaces with the tree being effective to locate the center of the tree in a predetermined plane which has a fixed relationship with said first delimbing knife while the tree is being delimbed thereby and maintaining the center of the tree in said plane while delimbing is being accomplished and the tree diameter encountering the delimbing mechanism varies.

19. Apparatus for use in harvesting trees as defined in claim 18 wherein said delimbing mechanism further includes a third delimbing knife for delimbing a third portion of the outer circumference of the tree.

20. Apparatus for use in harvesting trees comprising a delimbing mechanism for delimbing a felled tree upon relative movement between the tree and the delimbing mechanism; said delimbing mechanism including a first delimbing knife for delimbing a first portion of the outer circumference of the tree, a second delimbing knife for delimbing at least a second portion of the outer circumference of the tree, first fluid means for effecting movement of said second delimbing knife into engagement with the tree, second fluid means for continuously urging said second delimbing knife into engagement with the tree after said second delimbing knife is moved into engagement with the tree by said first fluid means to maintain said second delimbing knife in engagement with the tree as the diameter of the portion of the tree received in said delimbing mechanism varies due to said relative movement between the tree and said delimbing mechanism, and means for locating the center of the tree in a predetermined plane which has a fixed relationship with said first delimbing knife while the tree is being delimbed thereby and maintaining the center of the tree in said plane while delimbing is being accomplished and the tree diameter varies.

21. Apparatus for use in harvesting trees as defined in claim 20 wherein said delimbing mechanism further includes a third delimbing knife for delimbing a third portion of the outer circumference of the tree.

22. Apparatus for use in harvesting trees as defined in claim 20 further including third fluid means for continuously urging said third delimbing knife into engagement with the tree after said second delimbing knife is moved into engagement with the tree by said first fluid means so that said third fluid means maintains said third delimbing knife in engagement with the tree as the diameter of the portion of the tree received in said delimbing mechanism varies due to said relative movement between the tree and said delimbing mechanism.

23. Apparatus for use in harvesting trees as defined in claim 18 further including a cutting mechanism for cutting the tree into bolts having a predetermined length after the tree has been delimbed in said delimbing mechanism.

24. Apparatus for use in harvesting trees as defined in claim 23 wherein said cutting mechanism and said delimbing mechanism are supported on a pivotable boom assembly.

25. Apparatus for use in harvesting trees as defined in claim 24 further including a clamping mechanism supported by said boom assembly for movement toward and away from said delimbing mechanism and operable to engage with the tree and effect movement of the tree relative to said delimbing mechanism to thereby effect delimbing of the tree.

26. Apparatus for use in harvesting trees as defined in claim 25 wherein said cutting mechanism is supported for movement upon said boom assembly and is movable toward said delimbing mechanism when said clamping mechanism moves toward said delimbing mechanism.

27. Apparatus for use in harvesting trees as defined in claim 26 further including a second boom assembly having cutting and clamping means thereon for felling a standing tree and effecting movement of the tree, a receiver mechanism for receiving a felled tree from said clamping means on said second boom assembly and operable to transfer the tree to said delimbing mechanism.

28. Apparatus for use in harvesting trees comprising a delimbing mechanism for delimbing a tree which is moved relative to said delimbing mechanism, said delimbing mechanism including a first delimbing knife for delimbing a first portion of the outer circumference of the tree, a second delimbing knife for delimbing a second portion of the outer circumference of the tree, a third delimbing knife for delimbing a third portion of the outer circumference of the tree, said second and third delimbing knives being supported for pivotal movement about a common axis from a retracted position to a working position, and means for moving said second and third delimbing knives about said common axis relative to said first delimbing knife from the retracted position into working engagement with the tree and for maintaining said second and third delimbing knives against the tree as the diameter of the portion of the tree with which they are engaged varies.

29. Apparatus for use in harvesting trees as defined in claim 28 wherein said means for moving said second and third delimbing knives includes first fluid means which when actuated effect pivotable movement of said second delimbing knife about said common axis to thereby effect engagement of said second delimbing knife with the tree.

30. Apparatus for use in harvesting trees as defined in claim 29 wherein said means for urging said second and third delimbing knives against the tree includes second and third fluid means for continuously urging said second and third delimbing knives, respectively, about said common axis after said first fluid means have been actuated to effect initial engagement of said second knife with the tree to thereby maintain the second and third delimbing knives against the tree as the diameter of the portion of the tree with which they are engaged varies due to the relative movement of the tree and the delimbing mechanism.

31. Apparatus for use in harvesting trees as defined in claim 28 wherein said second delimbing knife is further operable to move into engagement with the tree and effect delimbing of a fourth portion of the outer circumference of the tree which is spaced apart from the second portion of the tree with which said second delimbing knife engages, and said third delimbing knife is operable to effect delimbing on the third portion of the outer circumference of the tree which extends between said second and fourth portions of the outer circumference of the tree.

32. Apparatus for use in harvesting trees as defined in claim 28 wherein said second delimbing knife is further operable to effect delimbing of a fourth portion of the outer circumference of the tree which extends between the first and third portions and is contiguous therewith and said first delimbing knife is operable to effect delimbing of the first portion of the outer circumference of the tree which extends between and is contiguous to the second and fourth portions of the outer circumference of the tree so that said first, second, and third delimbing knives cooperate to surround the tree as it passes through said delimbing mechanism to thereby effect removal of all limbs on the tree as it passes through the delimbing mechanism.

33. Apparatus for use in harvesting trees as defined in claim 28 wherein said first delimbing knife is movable to eject from said delimbing mechanism a portion of the tree which has a diameter which has a magnitude less than a predetermined magnitude.

34. Apparatus for use in harvesting trees as defined in claim 33 further including sensing means responsive to movement of said second delimbing knife about said common axis and which is operable to sense and effect actuation of said first delimbing knife to effect ejectment of a portion of the tree when the diameter of the portion of the tree which is moving through said delimbing mechanism is below a predetermined magnitude.

35. Apparatus for use in harvesting trees comprising a support, a tree-processing boom carried by said support, a delimbing mechanism supported on one end of said boom and which is adapted to receive a tree and effect delimbing of the tree upon relative movement between said delimbing mechanism and the tree, a clamping mechanism carried by said boom and movable relative thereto, said clamping mechanism including means for engaging the trunk of the tree and for moving the tree relative to said boom, means supporting said boom for pivotal movement about a substantially horizontal axis, and a fluid cylinder operatively associated with said tree-processing boom for acting on said tree-processing boom when a tree is supported thereon and for enabling said tree-processing boom to assume a position which is substantially parallel to the position assumed by the tree supported thereon.

36. Apparatus for use in harvesting trees as defined in claim 35 further including a cutting mechanism supported on said tree-processing boom and operable to cut bolts of a predetermined length from the delimbed portion of the tree.

37. Apparatus for use in harvesting trees as defined in claim 36 further including a bunk mechanism located on said support adjacent said clamping and cutting mechanisms and operable to receive bolts of a predetermined length therefrom and store the bolts therein.

38. Apparatus for use in harvesting trees as defined in claim 35 wherein said tree-processing boom has a T-shaped cross-sectional configuration which is operable to rigidly support for movement thereon said clamping mechanism.

39. Apparatus for use in harvesting trees as defined in claim 35 wherein said support comprises a self-propelled vehicle having tree-felling and tree-gripping means thereon for felling and gripping a tree and moving a tree to a position in which it may be received by said delimbing mechanism.

40. Apparatus for use in harvesting trees comprising a tree-processing means for processing a tree including a cutting mechanism for cutting the tree into bolts of a predetermined length, and a bunk mechanism for receiving the bolts of the tree, said bunk mechanism being operable to receive and store a plurality of bolts therein and being actuatable to dump the plurality of bolts, said bunk mechanism including support means, at least a pair of substantially arcuate members extending downwardly from said support means and cooperating to support the bolts, and a mechanism for moving said members endwise along a path upwardly relative to said support means to thereby effect dumping of said bolts therefrom.

41. Apparatus for use in harvesting trees as defined in claim 40 wherein said arcuate members have members rigidly affixed thereto and said mechanism for moving said arcuate members includes a rotatable sprocket for rotating and engaging with said members to thereby effect endwise movement of said arcuate members.

42. Apparatus for use in harvesting trees as defined in claim 41 wherein said support means further includes means which supports said arcuate members and absorbs the shock of bolts falling thereon from said cutting mechanism to thereby prevent damage to said mechanism for moving said members.

43. Apparatus for use in harvesting trees as defined in claim 40 wherein said arcuate members include arcuate arm members which are movable arcuately in an upwardly direction to effect dumping of bolts from said bunk mechanism by imparting a rolling motion to the bolts to thereby prevent wedging of the bolts in the bunk mechanism.

44. Apparatus for use in harvesting trees as defined in claim 40 further including a delimbing mechanism for delimbing a tree upon relative movement between the tree and the delimbiNg mechanism.

45. Apparatus for use in harvesting trees as defined in claim 44 further including a clamping mechanism for engaging with a portion of a tree in said delimbing mechanism and moving the tree relative to said delimbing mechanism to thereby effect delimbing of the tree.

46. Apparatus for use in harvesting trees as defined in claim 45 wherein said cutting mechanism is located between said delimbing mechanism and said clamping mechanism, said clamping mechanism is movable toward and away from said delimbing mechanism and said cutting mechanism is movable toward and away from said delimbing mechanism in response to movement of said clamping mechanism toward and away from said delimbing mechanism.

* * * * *